(12) United States Patent
Araki

(10) Patent No.: US 8,632,896 B2
(45) Date of Patent: Jan. 21, 2014

(54) RADIATION-CURABLE VINYL CHLORIDE COPOLYMER, RADIATION-CURABLE COMPOSITION, AND MAGNETIC RECORDING MEDIUM

(75) Inventor: Katsumi Araki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 349 days.

(21) Appl. No.: 12/944,370

(22) Filed: Nov. 11, 2010

(65) Prior Publication Data

US 2011/0111258 A1 May 12, 2011

(30) Foreign Application Priority Data

Nov. 12, 2009 (JP) ................................. 2009-258468

(51) Int. Cl.
*C08F 228/02* (2006.01)
*C08K 5/08* (2006.01)
(52) U.S. Cl.
USPC ........ 428/800; 526/292.4; 526/266; 526/287; 525/123; 524/358
(58) Field of Classification Search
USPC ........ 428/800; 526/292.4, 266, 287; 525/123; 524/358
See application file for complete search history.

(56) References Cited

U.S. PATENT DOCUMENTS

| 7,001,955 B2 | 2/2006 | Sasaki et al. |
| 2004/0241497 A1 | 12/2004 | Sasaki et al. |

FOREIGN PATENT DOCUMENTS

| JP | 61-192022 A | 8/1986 |
| JP | 05-186515 A | 7/1993 |
| JP | 05-186516 A | 7/1993 |
| JP | 09-132749 A | 5/1997 |
| JP | 3125947 A | 11/2000 |
| JP | 2004-352804 A | 12/2004 |
| JP | 2005-008866 A | 1/2005 |

OTHER PUBLICATIONS

Office Action dated Nov. 5, 2013 in Japanese Application No. 2009-258468.

*Primary Examiner* — Robert D. Harlan
(74) *Attorney, Agent, or Firm* — Sughrue Mion, PLLC

(57) ABSTRACT

An aspect of the present invention relates to a radiation-curable vinyl chloride copolymer, which comprises a structural unit denoted by general formula (1):

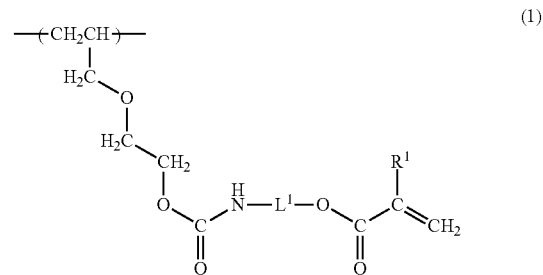

(1)

wherein, in general formula (1), $R^1$ denotes a hydrogen atom or a methyl group, and $L^1$ denotes a divalent linking group denoted by formula (2), formula (3), or general formula (4):

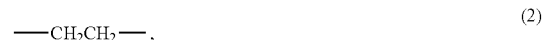

(2)

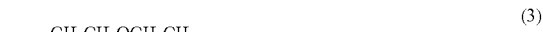

(3)

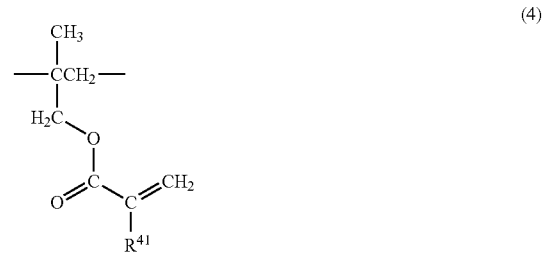

(4)

wherein, in general formula (4), $R^{41}$ denotes a hydrogen atom or a methyl group.

20 Claims, No Drawings

RADIATION-CURABLE VINYL CHLORIDE COPOLYMER, RADIATION-CURABLE COMPOSITION, AND MAGNETIC RECORDING MEDIUM

CROSS-REFERENCE TO RELATED APPLICATIONS

This application claims the benefit of priority under 35 USC 119 to Japanese Patent Application No. 2009-258468, filed on Nov. 12, 2009, which is expressly incorporated herein by reference in its entirety.

BACKGROUND OF THE INVENTION

1. Field of the Invention

The present invention relates to a radiation-curable vinyl chloride copolymer, and more particularly, to a radiation-curable vinyl chloride copolymer with good curability when irradiated with radiation.

The present invention further relates to a radiation-curable composition comprising the above copolymer, and a magnetic recording medium comprising a radiation-cured layer formed by using the above copolymer.

2. Discussion of the Background

In particulate magnetic recording media, the binder plays important roles in the dispersion of magnetic particles, coating durability, electromagnetic characteristics, running durability, and the like. Accordingly, various binders for magnetic recording media have been studied.

Vinyl chloride resins, polyurethane resins, polyester resins, acrylic resins, and other thermosetting resins and thermoplastic resins have conventionally been widely employed as binders in magnetic recording media. Moreover, the use of radiation-curable resins incorporating radiation-curable functional groups as binders for magnetic recording media has been proposed in recent years. Since processing to cure radiation-curable resins takes less time than for thermosetting resins, they are advantageous in terms of productivity. For example, Documents 1 (Japanese Unexamined Patent Publication (KOKAI) No. 2004-352804) and English language family member US2004/241497A1 and U.S. Pat. No. 7,001,955, Document 2 (Japanese Unexamined Patent Publication (KOKAI) No. 2005-8866), and Document 3 (Japanese Patent No. 3125947), which are expressly incorporated herein by reference in their entirety, propose the use of radiation-curable vinyl chloride copolymers as binders in magnetic recording media.

Since a magnetic recording medium is normally subjected to repeated use for extended periods, one required physical property is running durability. Accordingly, the binder for a magnetic recording medium is desirably one that forms a tough coating that is able to withstand repeated running. However, the radiation-curable vinyl chloride copolymers described in Documents 1 to 3 cure inadequately when cured with radiation and cannot form high-strength coatings.

Further, in a magnetic recording medium sequentially comprised of a nonmagnetic layer and a magnetic layer on a nonmagnetic support, the poor curability of the nonmagnetic layer may compromise electromagnetic characteristics, storage property, and running durability. This is caused by the following reason.

When sequentially applying a multilayer coating comprised of a lower layer in the form of a nonmagnetic layer coating liquid and an upper layer in the form of a magnetic layer coating liquid, a portion of the nonmagnetic layer will sometimes dissolve into the solvent contained in the magnetic layer coating liquid. When the nonmagnetic layer is a radiation-cured layer, exposure to radiation causes the radiation-curable components in the nonmagnetic layer to polymerize and crosslink, resulting in a high molecular weight and thereby inhibiting or diminishing dissolution into the solvent contained in the magnetic layer coating liquid. Accordingly, when sequentially applying a multilayer coating comprised of a lower layer in the form of a nonmagnetic layer coating liquid and an upper layer in the form of a magnetic layer coating liquid, radiation is desirably irradiated before applying the upper layer in the form of the magnetic layer coating liquid, after which the magnetic layer is desirably formed over the cured nonmagnetic layer. However, when the nonmagnetic layer cures poorly, even when the magnetic layer is formed over a nonmagnetic layer that has been cured with radiation, it is difficult to adequately inhibit interlayer mixing due to dissolution of the nonmagnetic layer into the magnetic layer coating liquid. As a result, interfacial fluctuation increases between the nonmagnetic layer and the magnetic layer and thus the smoothness of the surface of the magnetic layer decreases, compromising electromagnetic characteristics.

Further, when there is inadequate curing of the nonmagnetic layer, large amounts of nonmagnetic layer components migrate to the magnetic layer side. This results in a large amount of various components seeping out from the surface of the magnetic layer. When such a phenomenon occurs, the storage property of the medium deteriorates because the medium sticks during storage, precipitates form on the medium surface, and the like. Further, when curing of the nonmagnetic layer is inadequate, magnetic layer components tend to permeate the nonmagnetic layer. As a result, the magnetic layer becomes nonuniform and the coating strength of the magnetic layer decreases, thereby compromising running durability.

As set forth above, the radiation-curable resin that is employed in the nonmagnetic layer is required to be highly curable. However, as stated above, the radiation-curable vinyl chloride copolymers described in Documents 1 to 3 do not adequately cure when exposed to radiation and do not afford adequate characteristics for use as binders in the nonmagnetic layer.

SUMMARY OF THE INVENTION

An aspect of the present invention provides for a radiation-curable vinyl chloride copolymer with good curability that is suited to use in magnetic recording media.

The present inventor conducted extensive research into achieving the above-stated radiation-curable vinyl chloride copolymer. This resulted in the knowledge that, in addition to incorporating a highly reactive radiation-curable functional group, imparting a suitable degree of flexibility to the structure of the resin was effective for increasing the curability of a radiation-curable resin. This was attributed to the fact that when resins in which highly reactive radiation-curable functional groups had been incorporated had structures that were rigid, the radiation-curable functional groups were unable to adequately approach each other, making it difficult for a crosslinked structure to form.

Accordingly, the present inventor conducted further research based on this knowledge. This resulted in the discovery that a radiation-curable vinyl chloride copolymer having the structural unit denoted by formula (1) below could exhibit good curability when exposed to radiation and permit the formation of a tough coating. The present inventor presumed that in the structure denoted by formula (1), the fact that the (meth)acryloyloxy group enclosed in the round frame was a particularly highly reactive group among various radiation-curable functional groups, and the fact that the portion linking it to the main chain enclosed in the square frame had adequate flexibility to allow the formation of a crosslinked structure were why the radiation-curable vinyl chloride copolymer could exhibit good curability when exposed to radiation.

The present invention was devised based on the above knowledge.

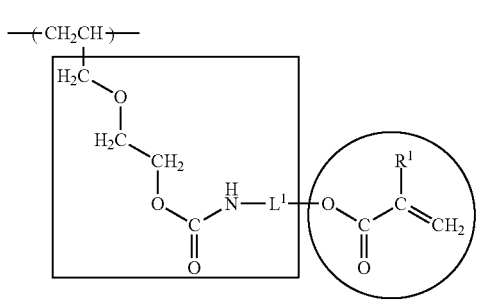

(1)

(Details of formula (1) will be described further below,)

An aspect of the present invention relates to a radiation-curable vinyl chloride copolymer, which comprises a structural unit denoted by formula (1):

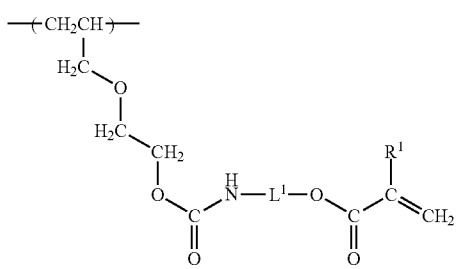

(1)

wherein, in formula (1), $R^1$ denotes a hydrogen atom or a methyl group, and $L^1$ denotes a divalent linking group denoted by formula (2), formula (3), or formula (4):

$$—CH_2CH_2—, \quad (2)$$

$$—CH_2CH_2OCH_2CH_2—, \quad (3)$$

(4)

[structure for formula (4)]

wherein, in formula (4), $R^{41}$ denotes a hydrogen atom or a methyl group.

The above radiation-curable vinyl chloride copolymer may further comprise a structural unit denoted by formula (5):

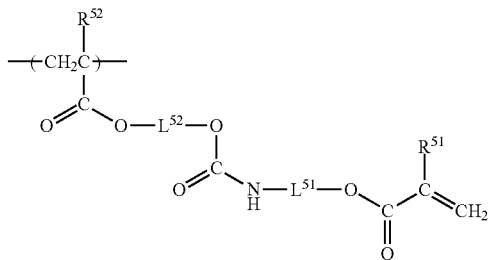

(5)

wherein, in formula (5), each of $R^{51}$ and $R^{52}$ independently denotes a hydrogen atom or a methyl group, $L^{51}$ denotes the divalent linking group denoted by formula (2), formula (3), or formula (4), and $L^{52}$ denotes a divalent linking group.

The above radiation-curable vinyl chloride copolymer may further comprise a cyclic ether structure.

The above radiation-curable vinyl chloride copolymer may comprise a polar group selected from the group consisting of a sulfonic acid group, a sulfonate group, a sulfuric acid group, and a sulfate group.

The above radiation-curable vinyl chloride copolymer may comprise a structural unit denoted by formula (6):

(6)

[structure for formula (6)]

wherein, in formula (6), $R^6$ denotes a hydrogen atom or a methyl group, $L^6$ denotes the divalent linking group denoted by formula (2), formula (3), or formula (4), and M denotes a hydrogen atom or a cation.

The above radiation-curable vinyl chloride copolymer may comprise the above polar group in an amount ranging from 10 mmol/kg to 2000 mmol/kg.

The above radiation-curable vinyl chloride copolymer may comprise the structural unit denoted by formula (1) in a proportion ranging from 1 mole percent to 50 mole percent.

A further aspect of the present invention relates to a binder for a magnetic recording medium (also referred to as a "magnetic recording medium binder", hereinafter) comprised of the above radiation-curable vinyl chloride copolymer.

A still further aspect of the present invention relates to a radiation-curable composition, which comprises the above radiation-curable vinyl chloride copolymer.

The above radiation-curable composition may further comprise a benzoquinone compound.

The above radiation-curable composition may further comprise a radiation-curable polyurethane resin.

The above radiation-curable composition may be employed as a coating liquid for manufacturing a magnetic recording medium, or for the preparation of such a coating liquid.

A still further aspect of the present invention relates to a cured product obtained by radiation-curing the above radiation-curable composition.

A still further aspect of the present invention relates to a magnetic recording medium comprising a magnetic layer comprising a ferromagnetic powder and a binder on a nonmagnetic support, which comprises at least one radiation-cured layer obtained by radiation-curing a coating layer comprising a radiation-curable vinyl chloride copolymer, the radiation-curable vinyl chloride copolymer being the above radiation-curable vinyl chloride copolymer.

In the above magnetic recording medium, the radiation-cured layer may be the magnetic layer.

The above magnetic recording medium may comprise a nonmagnetic layer comprising a nonmagnetic powder and a binder between the nonmagnetic support and the magnetic layer, and the nonmagnetic layer may be the radiation-cured layer.

In the above magnetic recording medium, the coating layer may further comprise a benzoquinone compound.

In the above magnetic recording medium, the coating layer may further comprise a radiation-curable polyurethane resin.

The present invention can provide a radiation-curable vinyl chloride copolymer that exhibits good curability (crosslinks well) when exposed to radiation and that is suited to use in magnetic recording media.

The radiation-curable vinyl chloride copolymer of the present invention can exhibit good curability when exposed to radiation and can form a coating layer of high coating strength when employed to form coating layers such as the magnetic layer and nonmagnetic layer in a magnetic recording medium. In contrast to the lengthy thermoprocessing that is required to cure the coating when employing a thermosetting resin as binder in a magnetic recording medium, the radiation-curable vinyl chloride copolymer of the present invention is highly advantageous from the perspective of productivity in that the coating is cured by brief exposure to radiation when employing a radiation-curable resin.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Radiation-Curable Vinyl Chloride Copolymer

The radiation-curable vinyl chloride polymer of the present invention (also referred to as simply the "copolymer", hereinafter) is a vinyl chloride copolymer comprising a radiation-curable functional group that can undergo a curing (crosslinking) reaction when exposed to radiation. At least one of the radiation-curable functional groups is a (meth) acryloyloxy group comprised in the structural unit denoted by formula (1) below. As stated above, it is presumed that in the radiation-curable vinyl chloride copolymer of the present invention, a highly reactive (meth)acryloyloxy group is bonded to the main chain through a linking portion of suitable flexibility, thereby exhibiting high curability when exposed to radiation.

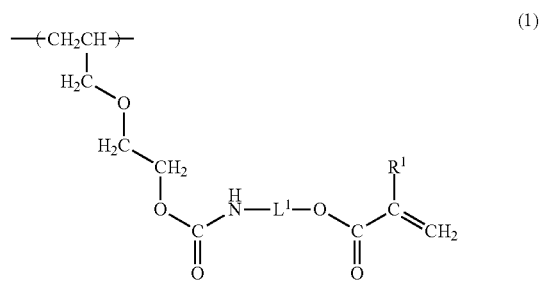

Formula (1) will be described in greater detail below.

In formula (1), $R^1$ denotes a hydrogen atom or a methyl group. A high degree of curability can be achieved regardless of whether $R^1$ denotes a hydrogen atom or a methyl group. From the perspective of availability, $R^1$ desirably denotes a methyl group.

In formula (1), $L^1$ denotes a divalent linking group denoted by formula (2), formula (3), or formula (4), below. In formula (4), $R^{41}$ denotes a hydrogen atom or a methyl group. From the perspective of availability, $R^{41}$ desirably denotes a hydrogen atom. Although varying with the system being employed, from the perspective of curability, the divalent linking groups denoted by formula (3) and formula (4) are generally desirable. From the perspective of cost, the divalent linking groups denoted by formulas (2) and (3) are desirable.

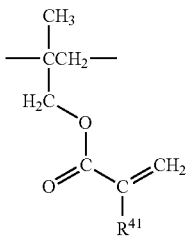

(4)

From the perspective of further increasing curability during exposure to radiation, the structural unit denoted by formula (1) desirably constitutes equal to or more than one mole percent of all polymerizing units (100 mole percent) in the copolymer of the present invention. The upper limit of the content of the structural unit denoted by formula (1) in the copolymer of the present invention is not specifically limited. However, by way of example, an adequate effect can be achieved at about equal to or less than 5 mole percent. In the copolymer of the present invention, the structural unit denoted by formula (1) desirably constitutes equal to or more than 1 mole percent and equal to or less than 50 mole percent of all polymerizing units (100 percent). Incorporating the structural unit denoted by formula (1) within the above range in the copolymer of the present invention makes it possible to achieve even higher curability.

Since the copolymer of the present invention is a vinyl chloride copolymer, a vinyl chloride-derived structural unit (the following structural unit) is contained along with the structural unit denoted by formula (1).

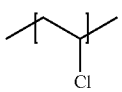

The content of the above structural unit derived from vinyl chloride in the copolymer of the present invention is not specifically limited. However, it desirably constitutes about 50 to 99 mole percent of all polymerizing units (100 mole percent).

The copolymer of the present invention can contain the structural unit denoted by formula (5) below. The incorporation of the structural unit denoted by formula (5) below can effectively enhance curability. Since the synthesis reaction of a copolymer containing the structural unit denoted by formula (5) is uncomplicated, this structural unit is desirable in terms of synthesis suitability.

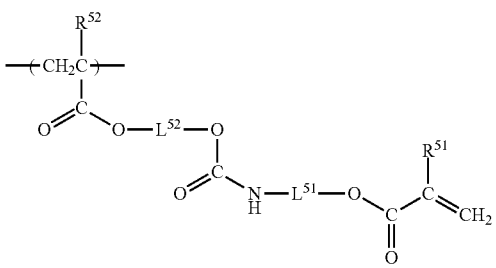

(5)

Formula (5) will be described below.

In formula (5), each of $R^{51}$ and $R^{52}$ independently denotes a hydrogen atom or a methyl group. High curability can be achieved regardless of whether $R^{51}$ and $R^{52}$ denote hydrogen atoms or methyl groups. From the perspective of availability, $R^{51}$ and $R^{52}$ desirably denote methyl groups. In formula (5), $L^{51}$ denotes the divalent linking group denoted by formula (2), formula (3), or formula (4) described above.

In formula (5), $L^{52}$ denotes a divalent linking group. The divalent linking group denoted by $L^{52}$ is desirably an alkyleneoxy group or alkylene group with 1 to 25 carbon atoms, preferably an alkyleneoxy group or alkylene group with 1 to 20 carbon atoms, and more preferably, a methylene group, ethylene group, propylene group, butylene group, ethyleneoxy group, diethyleneoxy group, or triethyleneoxy group. These groups may comprise substituents. In such cases, the number of carbon atoms refers to the number of carbon atoms of the moiety excluding substituents.

Desirable substituents that can be incorporated into $L^{52}$ are alkyl groups having 1 to 20 carbon atoms. Among these, alkyl groups with 1 to 15 carbon atoms are desirable, alkyl groups with 1 to 10 carbon atoms are preferred, and alkyl groups with 1 to 7 carbon atoms are of greater preference. Taking into account starting materials, suitability to synthesis, and the like, specific examples of optimal substituents are methyl groups, ethyl groups, branched or linear propyl groups, branched or linear butyl groups, branched or linear pentyl groups, and branched or linear hexyl groups.

In the copolymer of the present invention, it is possible to incorporate, for example, the structural unit denoted by formula (5) in a proportion of equal to or more than 1 mole percent and equal to or less than 45 mole percent of all polymerizing units (100 mole percent). Incorporation of the structural unit denoted by formula (5) within the above-stated range in the copolymer of the present invention can further enhance curability.

The copolymer of the present invention can comprise a cyclic ether structure. The incorporation of a cyclic ether structure can effectively enhance stability during copolymer synthesis and curability under a variety of conditions. A cyclic ether structure is also effective as a functional group for introducing a polar group into the copolymer. The cyclic ether structure is desirably an oxirane ring, oxetane ring, tetrahydrofuran ring, tetrahydropyran ring, or crown ether; preferably an oxirane ring, oxetane ring, tetrahydrofuran ring, or tetrahydropyran ring; and more preferably, an oxirane ring, oxetane ring, or tetrahydrofuran ring. The cyclic ether structure can be contained, for example, on a side chain portion of the copolymer. An example of a desirable embodiment is the incorporation of a cyclic ether structure into the structural unit denoted by formula (8) below.

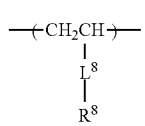

(8)

In formula (8), for example, $L^8$ denotes a divalent linking group, such as an oxyalkylene group in the form of —$CH_2OCH_2$—. $R^8$ denotes a cyclic ether structure, the details of which are as set forth above.

From the perspective of enhancing curability, the copolymer of the present invention desirably comprises from 1 to 100 cyclic ether structures per molecule. The content of the structural unit denoted by formula (8) above is, for example, desirably equal to or more than 1 mole percent and equal to or less than 45 mole percent of all polymerizing units (100 mole percent).

Polar groups are widely incorporated into magnetic recording medium binders to increase the dispersion of magnetic powder, nonmagnetic powder, and the like. Accordingly, from the perspective of suitability as a magnetic recording medium binder, the presence of a polar group in the copolymer of the present invention is desirable to enhance dispersibility. Examples of the polar group are hydroxyalkyl groups, carboxylic acid (salt) groups, sulfonic acid (salt) groups, sulfuric acid (salt) groups, and phosphoric acid (salt) groups. In the present invention, the term "sulfonic acid (salt) group" refers to substituents in which a in formula (A) below denotes 0, including the sulfonic acid group (—$SO_3H$) and sulfonate groups such as —$SO_3Na$, —$SO_3Li$, and —$SO_3K$. Further, the term "sulfuric acid (salt) group" refers to substituents in which a in formula (A) denotes 1, including the sulfuric acid group and sulfate groups in the same manner as above. The same applies to carboxylic acid (salt) groups, phosphoric acid (salt) groups, and the like.

$$*\text{-}(O)_a SO_3 M \tag{A}$$

In formula (A), M denotes a hydrogen atom or a cation; the symbol "*" denotes a bond position; and a denotes 0 or 1. When a=0 as set forth above, the substituent denoted by formula (A) is a sulfonic acid (salt) group. When a=1, the substituent denoted by formula (A) is a sulfuric acid (salt) group.

The cation may be an inorganic cation or an organic cation. The cation electrically neutralizes the —$(O)_a SO_3^-$ in formula (A); it is not limited to a monovalent cation, and may be a divalent or greater cation. The cation denoted by M is desirably a monovalent cation. When a cation of n-valence is employed, it means (1/n) mole of cations relative to the substituent denoted by formula (A).

The inorganic cations are not specifically limited. Alkali metal ions and alkaline earth metal ions are desirable, alkali metal ions are preferred, and $Li^+$, $Na^+$, and $K^+$ are of greater preference.

Examples of organic ions are ammonium ions, quaternary ammonium ions, and pyridinium ions.

M desirably denotes a hydrogen atom, alkali metal ion, quaternary ammonium ion, or pyridinium ion; preferably denotes a hydrogen atom, $Li^+$, $Na^+$, $K^+$, tetraalkylammonium ion, or pyridinium ion; and more preferably denotes $K^+$, a tetraalkylammonium ion, or a pyridinium ion.

An example of an embodiment of the copolymer of the present invention containing a sulfuric acid (salt) group is one that comprises the structural unit denoted by formula (6) below in which a sulfuric acid (salt) group has been substituted for the structural unit denoted by formula (1).

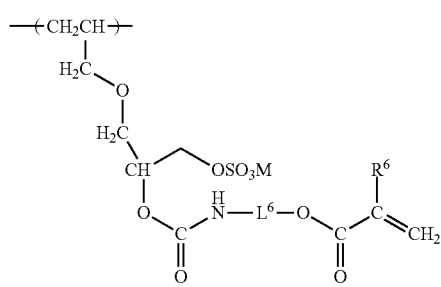

(6)

In formula (6), M denotes a hydrogen atom or a cation. The details are as set forth for M in formula (A).

In formula (6), $R^6$ denotes a hydrogen atom or a methyl group; $L^6$ denotes the divalent linking group denoted by formula (2), formula (3), or formula (4) described above. The details regarding $R^6$ and $L^6$ in formula (6) are as set forth for $R^1$ and $L^1$ in formula (1).

In the copolymer of the present invention, for example, a sulfonic acid (salt) group can be incorporated in the structural unit denoted by formula (7).

(7)

In formula (7), $R^7$ denotes a hydrogen atom or a methyl group, and $L^7$ denotes a divalent linking group, desirably an optionally branched alkylene group having 1 to 7 carbon atoms. The alkylene group may comprise a substituent. The details of the substituent are as set forth for the substituents contained in $L^2$.

In formula (7), M denotes a hydrogen atom or a cation. The details are as set forth for M in formula (A).

However, the copolymer of the present invention is not limited to those comprising structural unit (6) or (7). It can comprise a polar group such as a sulfonic acid (salt) group or sulfuric acid (salt) group at any position. A description of the quantity of polar groups contained in the copolymer of the present invention will be given further below.

The method of synthesizing the copolymer of the present invention will be described next.

The copolymer of the present invention is a vinyl chloride copolymer containing a structural unit denoted by formula (1) derived from the vinyl monomer. Thus, it is synthesized by copolymerizing at least a vinyl chloride monomer and vinyl monomer for introducing the structural unit denoted by formula (1). In the copolymerization reaction, for example, other monomers, such as monomers for introducing the structural units denoted by formulas (5) to (8) can be copolymerized. Examples of specific embodiments of the synthesis reaction are:

(A-1) the method of conducting a copolymerization reaction employed a monomer having a radiation-curable functional group as a starting material monomer;

(A-2) the method of copolymerizing the starting material monomers of the vinyl chloride copolymer in the presence of a compound containing a radiation-curable functional group; and (A-3) the method of incorporating a radiation-curable functional group onto the side chain of a vinyl chloride copolymer by means of a polymer reaction.

These embodiments can be combined as needed to obtain the copolymer of the present invention.

The following monomers are examples of starting material monomers that can be employed in each of the above embodiments: vinyl chloride, vinylidene chloride, optionally substituted (meth)acrylic acid, optionally substituted alkyl(meth)acrylates, optionally substituted aryl(meth)acrylates, optionally substituted (meth)acrylamides, (meth)acryloyl morpholines, aromatic hydrocarbon rings comprising vinyl groups (various styrenes), heteroaromatic rings comprising vinyl groups (vinylcarbazoles), maleic anhydride, derivatives thereof, fatty acid vinyl esters (various acetoxyethylenes), various benzoyloxyethylenes, optionally substituted alkyl allyl ethers, (meth)acrylonitrile, (meth)crotonnitrile, ethylene, butadiene, itaconic acid esters, crotonic acid esters, and vinyl pyrrolidones. In the above, the term (meth)acrylic acid includes both acrylic acid and methacrylic acid. The same applies to all terms containing "(meth)."

The following monomers are examples of monomers that are desirable in terms of ease of the synthesis reaction: vinyl chloride, vinylidene chloride, optionally substituted (meth)acrylic acid, optionally substituted (cyclo)alkyl(meth)acrylates having 1 to 25 carbon atoms, optionally substituted aryl(meth)acrylates having 1 to 25 carbon atoms, (meth)acrylamide, optionally substituted secondary or tertiary (cyclo)alkyl(meth)acrylamides having 1 to 25 carbon atoms, optionally substituted secondary or tertiary aryl(meth)acrylamides having 1 to 25 carbon atoms, optionally substituted (meth)acryloylmorpholines having 1 to 25 carbon atoms, substituted or unsubstituted aromatic hydrocarbon rings having 1 to 25 carbon atoms and comprising vinyl groups, substituted or unsubstituted heteroaromatic rings having 1 to 25 carbon atoms and comprising vinyl groups, maleic anhydride, substituted or unsubstituted partially esterified maleic acid having 1 to 25 carbon atoms, substituted or unsubstituted partially amidated maleic acid having 1 to 25 carbon atoms, itaconic acid, optionally substituted itaconic acid (cyclo)alkyl esters having 1 to 25 carbon atoms, optionally substituted itaconic acid aryl esters having 1 to 25 carbon atoms, crotonic acid, optionally substituted crotonic acid (cyclo)alkyl esters having 1 to 25 carbon atoms, optionally substituted crotonic acid aryl esters having 1 to 25 carbon atoms, optionally substituted acetoxyethylenes having 1 to 25 carbon atoms, optionally substituted benzoyloxyethylenes having 1 to 25 carbon atoms, optionally substituted alkyl allyl ethers, (meth)acrylonitrile, (meth)crotonnitrile, ethylene, butadiene, and vinylpyrrolidone.

Of these, the following monomers are examples of desirable monomers: vinyl chloride, vinylidene chloride, (meth)acrylic acid, optionally substituted (cyclo)alkyl(meth)acrylates having 1 to 20 carbon atoms, optionally substituted aryl (meth)acrylates having 1 to 20 carbon atoms, (meth)acrylamides, optionally substituted secondary and tertiary (cyclo)alkyl(meth)acrylamides having 1 to 20 carbon atoms, optionally substituted secondary and tertiary aryl(meth)acrylamides having 1 to 20 carbon atoms, optionally substituted (meth)acryloylmorpholines having 1 to 20 carbon atoms, substituted or unsubstituted aromatic hydrocarbon rings comprising vinyl groups and having 1 to 20 carbon atoms, substituted or unsubstituted heteroaromatic rings comprising vinyl groups and having 1 to 20 carbon atoms, maleic anhydride, substituted or unsubstituted partially esterified maleic acid having 1 to 20 carbon atoms, substituted or unsubstituted partially amidated maleic acid having 1 to 20 carbon atoms, itaconic acid, optionally substituted itaconic acid (cyclo)alkyl esters having 1 to 20 carbon atoms, optionally substituted itaconic acid aryl esters having 1 to 20 carbon atoms, crotonic acid, optionally substituted crotonic acid (cyclo)alkyl esters having 1 to 20 carbon atoms, optionally substituted crotonic acid aryl esters having 1 to 20 carbon atoms, optionally substituted acetoxyethylenes having 1 to 20 carbon atoms, optionally substituted benzoyloxyethylenes having 1 to 20 carbon atoms, optionally substituted alkyl allyl ethers having 1 to 20 carbon atoms, optionally substituted (meth)acrylonitriles having 1 to 20 carbon atoms, (meth)crotonnitrile, ethylene butadiene, and vinylpyrrolidone.

Of these, the following monomers are examples of preferred monomers: (meth)acrylic acid, optionally substituted methyl(meth)acrylates, ethyl(meth)acrylates, linear and branched propyl(meth)acrylates, linear and branched butyl(meth)acrylates, linear and branched pentyl(meth)acrylates, normal hexyl(meth)acrylate, cyclohexyl (meth)acrylate, normal heptyl(meth)acrylate, 2-ethyl hexyl(meth)acrylate, normal octyl(meth)acrylate, normal decyl(meth)acrylates, normal dodecyl(meth)acrylates, optionally substituted adamantyl(meth)acrylate, isobornyl(meth)acrylate, norbornane methyl(meth)acrylate, norbornene methyl(meth)acrylate, optionally substituted benzyl (meth)acrylate, naphthyl methyl(meth)acrylate, anthracene methyl(meth)acrylate, phenyl ethyl(meth)acrylate, optionally substituted phenyl (meth)acrylate, naphthyl (meth)acrylate, (meth)acrylamide, optionally substituted (di)methyl(meth)acrylamide, (di)ethyl (meth)acrylamide, linear and branched (di)propyl(meth)acrylamides, linear and branched (di)butyl(meth)acrylamides, linear and branched (di)pentyl (meth)acrylamide, (di) normal hexyl(meth)acrylamide, (di) cyclohexyl (meth)acrylamide, (di-)2-ethylhexyl(meth)acrylamide, optionally substituted adamantyl(meth)acrylamide, noradamantyl(meth)acrylamide, optionally substituted benzyl(meth)acrylamide, naphthyl ethyl(meth)acrylamide, phenyl ethyl (meth)acrylamide, optionally substituted (di) phenyl(meth)acrylamide, naphthyl (meth)acrylamide, (meth)acryloyl morpholine, piperidyl acrylamide, pyrrolidyl acrylamide, (α-methyl-)styrene, styrene sulfonic acid (salt), chloromethyl styrene, vinylpyridine, vinylimidazole, vinyltriazole, maleic anhydride, itaconic acid, crotonic acid, optionally substituted methyl crotonate, ethyl crotonate, linear and branched propyl crotonate, linear and branched butyl crotonate, linear and branched pentyl crotonate, normal hexyl crotonate, cyclohexyl crotonate, normal heptyl crotonate, 2-ethylhexyl crotonate, normal octyl crotonate, normal decyl crotonate, normal dodecyl crotonate, optionally substituted adamantyl crotonate, isobornyl crotonate, norbornane methyl crotonate, norbornene methyl crotonate, optionally substituted benzyl crotonate, naphthyl methyl crotonate, anthracene methyl crotonate, phenyl ethyl crotonate, optionally substituted phenyl crotonate, naphthyl crotonate, optionally substituted acetoxyethylene, optionally substituted benzoyloxyethylene, 2-hydroxyethyl allyl ether, 2-hydroxypropyl allyl ether, 3-hydroxypropyl allyl ether, optionally substituted vinylcarbazole, vinylpyrrolidone, (meth)acrylonitrile, ethylene, butadiene, and (meth)crotonnitrile.

Use of the following monomers is desirable from perspectives relating to suitability to use in magnetic recording media, such as solubility in solvents and coating suitability: methyl(meth)acrylate, ethyl(meth)acrylate, normal propyl (meth)acrylate, isopropyl(meth)acrylate, normal butyl(meth)acrylate, isobutyl(meth)acrylate, sec-butyl(meth)acrylate, normal pentyl(meth)acrylate, isopentyl(meth)acrylate, vinyl acetate, vinyl alcohol, 2-hydroxyethyl(meth)acrylate, polyethylene glycol (meth)acrylate, 2-hydroxypropyl(meth)acrylate, 3-hydroxypropyl(meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl(meth)acrylate, allyl glycidyl ether, phosphoethyl (meth)acrylate, sulfoethyl(meth)acrylate, p-styrene sulfonic acid, 2-acrylamide-2-methylpropanesulfonic acid, and metal salts such as Na salts and K salts, ammonium salts, and pyridine salts thereof.

Examples of copolymerizing monomers that can be employed are the above monomers into which radiation-curable functional groups have been incorporated. The details of the radiation-curable functional groups are as set forth above.

Other hydrophilic monomers may be suitably employed as the above copolymerizing monomers. Monomers comprising phosphoric acid, phosphoric acid esters, quaternary ammonium salt, ethyleneoxy chains, propyleneoxy chains, sulfonic acid, sulfuric acid groups, carboxylic acid groups, salts thereof (such as metal salts), morpholinoethyl groups, and the like can be employed.

Examples of substituents that can be present in the above-described monomer are those comprising partial structures in the form of alkyl groups, alkoxy groups, aryl groups, aryloxy groups, acyl groups, acyloxy groups, alkoxycarbonyl groups, aryloxycarbonyl groups, arylcarbonyl groups, amino groups dialkylamino groups, alkylamino groups, halogen atoms, hydroxyl groups, carboxyl groups, cyano groups, furyl groups, furfuryl groups, oxetane rings, oxirane rings, furan rings, tetrahydrofuran rings, tetrahydrofuryl rings, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, phosphinic acid, and the like.

The following are desirable as the above substituents: substituents having partial structures in the form of alkyl groups having 1 to 20 carbon atoms, alkoxy groups having 1 to 20 carbon atoms, aralkyl groups having 1 to 20 carbon atoms, aryl groups having 1 to 20 carbon atoms, aryloxy groups having 1 to 20 carbon atoms, acyloxy groups having 1 to 20 carbon atoms, acyl groups having 1 to 20 carbon atoms, alkoxycarbonyl groups having 1 to 20 carbon atoms, aryloxycarbonyl groups having 1 to 20 carbon atoms, arylcarbonyl groups having 1 to 20 carbon atoms, amino groups, dialkylamino groups having 1 to 20 carbon atoms, alkylamino groups having 1 to 20 carbon atoms, halogen atoms, hydroxyl groups, carboxyl groups, cyano groups, furyl groups, furfuryl groups, oxetane rings, oxirane rings, furan rings, tetrahydrofuran rings, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid; halogen atoms; and the like.

Of these, the following are preferred as the above substituents: substituents having partial structures in the form of alkyl groups having 1 to 15 carbon atoms, alkoxy groups having 1 to 15 carbon atoms, aralkyl groups having 1 to 15 carbon atoms, aryl groups having 1 to 15 carbon atoms, aryloxy groups having 1 to 15 carbon atoms, acyloxy groups having 1 to 15 carbon atoms, acyl groups having 1 to 15 carbon atoms, alkoxycarbonyl groups having 1 to 15 carbon atoms, aryloxycarbonyl groups having 1 to 15 carbon atoms, arylcarbonyl groups having 1 to 15 carbon atoms, amino groups, dialkylamino groups having 1 to 15 carbon atoms, alkylamino groups having 1 to 15 carbon atoms, halogen atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid; halogen atoms; and the like.

The following are particularly preferred as the above substituents: substituents having partial structures in the form of methyl groups, ethyl groups, linear or branched propyl groups, linear or branched butyl groups, linear or branched pentyl groups, normal hexyl groups, cyclohexyl groups, normal heptyl groups, 2-ethylhexyl groups, normal octyl groups, normal decyl groups, normal dodecyl groups, methyloxy groups, ethyloxy groups, linear or branched propyloxy groups, linear or branched butyloxy groups, linear or branched pentyloxy groups, normal hexyloxy groups, cyclohexyloxy groups, normal heptyloxy groups, 2-ethylhexyloxy group, normal octyloxy groups, normal decyloxy groups, normal dodecyloxy groups, benzyl groups, phenethyl groups, naphthylmethyl groups, napthylethyl groups, phenyl groups, naphthyl groups, phenyloxy groups, naphthyloxy groups, methylcarbonyloxy groups, ethylcarbonyloxy groups, linear or branched propylcarbonyloxy groups, linear or branched butylcarbonyloxy groups, linear or branched pentylcarbonyloxy groups, normal hexylcarbonyloxy groups, cyclohexylcarbonyloxy groups, normal heptylcarbonyloxy groups, 2-ethylhexylcarbonyloxy groups, normal octylcarbonyloxy groups, normal decylcarbonyloxy groups, normal dodecylcarbonyloxy groups, methylcarbonyl groups (acetyl groups), ethylcarbonyl groups, linear or branched propylcarbonyl groups, linear or branched butylcarbonyl groups, linear or branched pentylcarbonyl groups, normal hexylcarbonyl groups, cyclohexylcarbonyl groups, normal heptylcarbonyl groups, 2-ethylhexylcarbonyl groups, normal octylcarbonyl groups, normal decylcarbonyl groups, normal dodecylcarbonyl groups, methyloxycarbonyl groups, ethyloxycarbonyl groups, linear or branched propyloxycarbonyl groups, linear or branched butyloxycarbonyl groups, linear or branched pentyloxycarbonyl groups, normal hexyloxycarbonyl groups, cyclohexyloxycarbonyl groups, normal heptyloxycarbonyl groups, 2-ethylhexyloxycarbonyl groups, normal octyloxycarbonyl groups, normal decyloxycarbonyl groups, normal dodecyloxycarbonyl groups, benzoyl groups, naphthylcarbonyl groups, (di)methylamino groups, (di)ethylamino groups, linear or branched (di)propylamino groups, linear or branched (di)butylamino groups, linear or branched (di)pentylamino groups, (di)normal hexylamino groups, (di)cyclohexylamino groups, (di)normal heptylamino groups, (di)-2-ethylhexylamino groups, fluorine atoms, chlorine atoms, bromine atoms, hydroxyl groups, carboxyl groups, cyano groups, furyl groups, furfuryl groups, tetrahydrofuryl groups, tetrahydrofurfuryl groups, alkylthio groups, trimethylsilyl groups, trifluoromethyl groups, carboxyl groups, thienyl groups, morpholino groups, morpholinocarbonyl groups, —OSO$_3$H groups, —SO$_3$H groups, phosphoric acid, phosphonic acid, and phosphinic acid. Fluorine atoms, chlorine atoms, bromine atoms, and the like are preferred. These substituents may be further substituted with the above substituents.

The type and number of starting material monomers are not specifically limited other than that at least two monomers be employed in the form of vinyl chloride and a vinyl-based monomer for introducing the structural unit denoted by formula (1). In addition to these two monomers, for example, 1 to 12 monomers may be employed, 1 to 10 monomers are desirably employed in combination, and 1 to 8 monomers are preferably employed in combination. In the blending of starting material monomers, it suffices to determine the composition of the copolymer desired. The content of the vinyl chloride monomer in the starting material monomers is desirably equal to or more than 60 weight percent and equal to or less than 95 weight percent in that good mechanical strength can be achieved, good solvent solubility can be attained, and a suitable solution viscosity can be achieved, resulting in good dispersion.

In embodiments (A-2) and (A-3) above, examples of the radiation-curable functional group-containing compound that is used to introduce a radiation-curable functional group are: (meth)acrylic acid, glycidyl(meth)acrylate, hydroxyalkyl (meth)acrylate, 2-isocyanatoethyl(meth)acrylate, 2-methacryloyloxyethyl isocyanate, 2-(2-isocyanate ethyloxy)ethyl methacrylate, 2-acryloyloxyethyl isocyanate, 1,1-bis(acryloyloxymethyl)ethyl isocyanate, and other compounds containing carbon-carbon double bond groups.

Taking into account ease of synthesis, cost, and availability of starting materials, the method of synthesizing the copolymer of the present invention is desirably embodiment (A-3), in which a polymer reaction is used to incorporate a radiation-curable functional group. The vinyl chloride copolymer employed in this embodiment is not specifically limited. A vinyl chloride copolymer comprising an active hydrogen group such as a hydroxyl group or a primary or secondary amine within the molecule is desirable in that a radiation-curable functional group can be readily introduced into the side chain by reaction with an isocyanate compound comprising a radiation-curable functional group. Such a vinyl chloride copolymer can be synthesized by known methods employing, for example, the above monomers that are capable of the copolymerization.

As set forth above, the copolymer of the present invention can comprise a polar group such as a sulfonic acid (salt) group. A single polar group, or two or more polar groups, can be incorporated. The incorporation of multiple polar groups is sometimes desirable in that, compared to when only a single polar group is incorporated, solubility in solvents such as cyclohexanone that are employed in the field of magnetic recording media is sometimes enhanced. The polar group can be introduced into the copolymer of the present invention by a known method such as copolymerization or an addition reaction. Further, a sulfonic acid (salt) group-containing vinyl chloride copolymer can be converted to another sulfonate group-containing vinyl chloride copolymer by salt exchange. Further, a known method can be employed to remove the salt and obtain sulfonic acid-containing vinyl chloride copolymer.

The synthesis reaction and reactions incorporating the radiation-curable functional group or polar group to obtain the copolymer of the present invention can be conducted by dissolving the starting material compounds in a solvent (reaction solvent), and heating, pressurizing, substituting nitrogen, and the like as needed. Commonly employed reaction conditions can be employed as the conditions for the above reaction, as the reaction temperature and duration of the reaction.

A known reaction catalyst can be employed in the above reaction. Examples are amine catalysts, organic tin catalysts, and organic bismuth catalysts. Examples of amine catalysts are: diethylene triamine, N-methyl morpholine, tetramethyl hexamethylene diamine, dimethyl formamide, dimethyl acetamide, and N-methyl pyrrolidone. Examples of organic tin catalysts are dibutyltin dilaurate, dioctyltin dilaurate, dibutyltin didecanate, and dioctyltin didecanate. An example of an organic bismuth catalyst is bismuth tris(2-ethylhexanoate). An organic tin catalyst or an organic bismuth catalyst is desirably employed as the catalyst in the present invention.

The quantity of catalyst added is, for example, 0.00001 to 5 weight parts, desirably 0.0001 to 1 weight part, and preferably, 0.00001 to 0.1 weight part, relative to the total weight of the starting material compounds employed in the reaction.

A known solvent that is commonly employed in the above reactions can be selected as the reaction solvent. Examples are ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethyl formamide, N,N-dimethyl acetamide, and N-methylpyrrolidone; sulfoxide solvents such as dimethyl sulfoxide; methylene chloride; chloroform; and cyclohexane.

Following the synthesis reaction, purification and the like can be conducted by a known method as needed to obtain the copolymer of the present invention. The fact that the targeted copolymer has been obtained can be confirmed by a known identification method such as NMR. The use of methyl ethyl ketone, cyclohexanone, or a mixed solvent thereof, which are widely used in coating liquids for forming magnetic recording media, as the reaction solvent for the synthesis reaction makes it possible to employ the reaction solution following synthesis as is, or after adding an optional additive, as the coating liquid for forming a magnetic recording medium.

The various physical properties of the copolymer of the present invention will be described next.

(a) Average Molecular Weight, Molecular Weight Distribution

The copolymer of the present invention desirably has a weight average molecular weight of equal to or greater than 10,000 and equal to or less than 500,000 (in the present invention, "equal to or greater than 10,000 and equal to or less than 500,000" is also denoted as "10,000 to 500,000"; identical below), preferably 10,000 to 400,000, and more preferably, 10,000 to 300,000. A weight average molecular weight of equal to or greater than 10,000 is desirable in that the storage property of a coating layer formed using the copolymer of the present invention as binder will be good. A weight average molecular weight of equal to or less than 500,000 is desirable in that good dispersion can be achieved.

The molecular weight distribution (weight average molecular weight Mw/number average molecular weight Mn) of the copolymer of the present invention is desirably 1.00 to 5.50, preferably 1.01 to 5.40. A molecular weight distribution of equal to or lower than 5.50 is desirable in that the composition distribution can be narrow and good dispersion can be achieved. The weight average molecular weight and molecular weight distribution (Mw/Mn) normally change little or not at all before and after the reaction introducing a radiation-curable functional group and/or a polar group into the vinyl chloride copolymer.

(b) Glass Transition Temperature

The glass transition temperature (Tg) of the copolymer of the present invention is desirably 10 to 180° C., preferably 10 to 170° C. A glass transition temperature of equal to or higher than 10° C. is desirable in that a strong coating can be formed by curing with radiation, yielding a coating of good durability and storage property. When employing the copolymer of the present invention as a magnetic recording medium binder, a glass transition temperature of equal to or lower than 180° C. is desirable in that it can yield good calendering properties even when calendering is conducted after radiation curing and thus can yield a magnetic recording medium with good electromagnetic characteristics. The glass transition temperature (Tg) of the coating that is formed by radiation curing the copolymer of the present invention is desirably 30 to 200° C., preferably 40 to 160° C. A glass transition temperature of equal to or higher than 30° C. is desirable in that good coating strength can be achieved with enhanced durability and storage property. A coating with a glass transition temperature of equal to or lower than 200° C. is desirable in a magnetic recording medium in that good calendering properties and electromagnetic characteristics can be achieved.

(c) Polar Group Content

As set forth above, the radiation-curable vinyl chloride copolymer of the present invention desirably comprises a polar group.

The content of the polar group in the radiation-curable vinyl chloride copolymer is desirably 1.0 to 3,500 mmol/kg, preferably 1.0 to 3,000 mmol/kg, and more preferably, 1.0 to 2,500 mmol.

A polar group content of equal to or higher than 1.0 mmol/kg is desirable in that adequate strength of adsorption to powder such as ferromagnetic powder and nonmagnetic powder can be achieved and good dispersion can be attained. A polar group content of equal to or lower than 3,500 mmol/kg is desirable in that good dissolution in solvent can be achieved. As set forth above, a polar group in the form of the sulfonic acid (salt) group or sulfuric acid (salt) group denoted by formula (A) is desirable. The content of polar groups selected from the group consisting of sulfonic acid (salt) groups and sulfuric acid (salt) groups is desirably equal to or greater than 10 mmol/kg and equal to or less than 2,000 mmol/kg from the perspective of achieving both dispersion and solvent solubility.

(d) Hydroxyl Group Content

The copolymer of the present invention desirably contains hydroxyl (OH) groups. The number of hydroxyl groups contained is desirably 1 to 100,000, preferably 1 to 10,000, per molecule. When the number of hydroxyl groups falls within this range, solubility in solvent can increase and good dispersion can be achieved.

(e) Radiation-Curable Functional Group Content

The copolymer of the present invention contains a (meth) acryloyloxy group in the form of the radiation-curable functional group in the functional unit denoted by formula (1), and can contain various other radiation-curable functional groups. The details of these radiation-curable functional groups are as set forth above. The content of the radiation-curable functional group in the copolymer of the present invention is desirably 1.0 to 4,000 mmol/kg, preferably 1.0 to 3,000 mmol/kg, and more preferably, 1.0 to 2,000 mmol/kg. A radiation-curable functional group content of equal to or higher than 1.0 mmol/kg is desirable in that a coating of high strength can be formed by radiation-curing. A radiation-curable functional group content of equal to or lower than 4,000 mmol/kg is desirable in that good calendering moldability can be achieved even when calendering is conducted after radiation-curing, and thus a magnetic recording medium with good electromagnetic characteristics can be achieved employing the copolymer of the present invention as a magnetic recording medium binder.

Specific examples of the copolymer of the present invention (Example Compounds (1) to (10)) are given below. However, the present invention is not limited to the specific examples below. The numbers positioned to the right of the various structural units below denotes mole ratios of the various structural units to all polymerizing units in the copolymer.

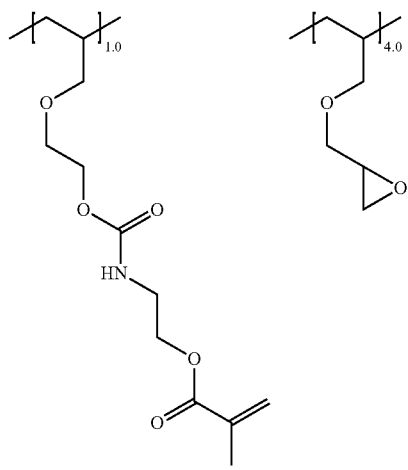

(1)

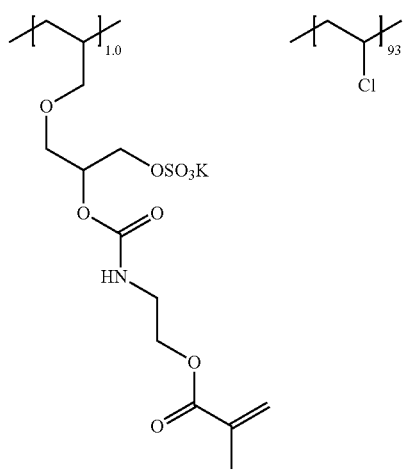

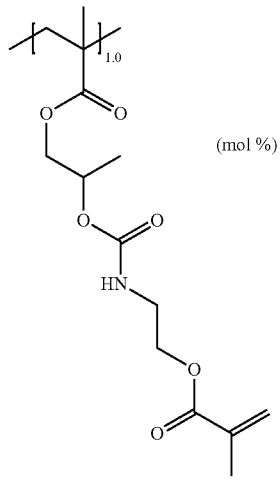

(mol %)

(2)
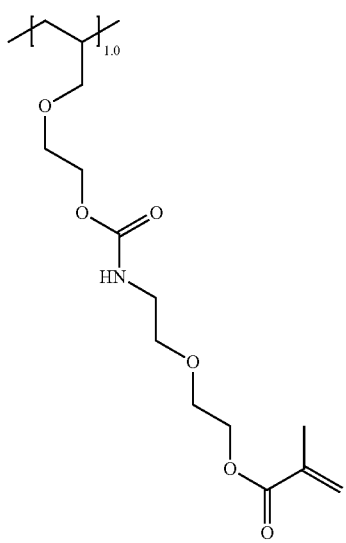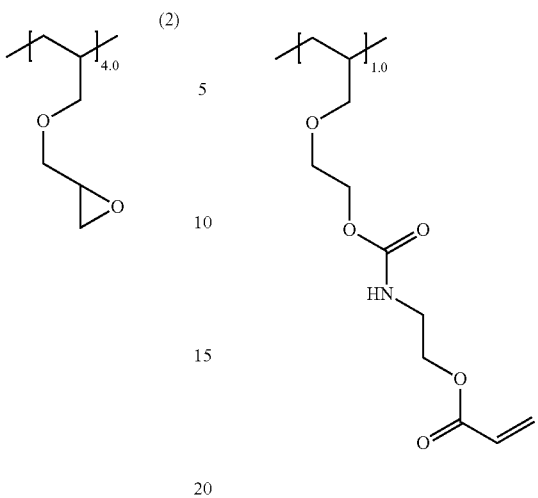
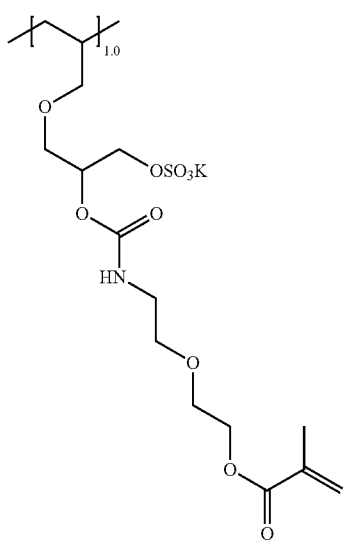
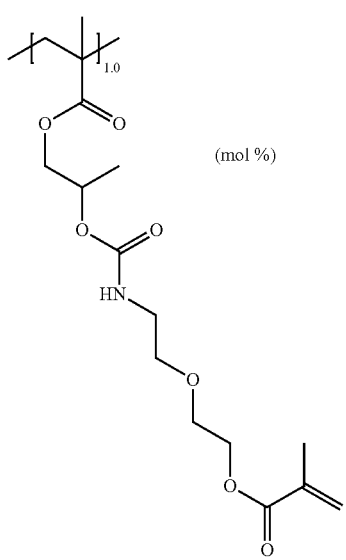
(mol %)
(3)
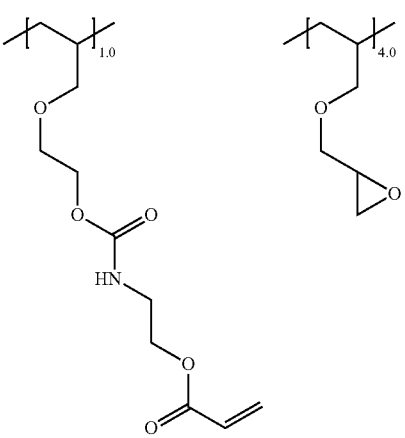
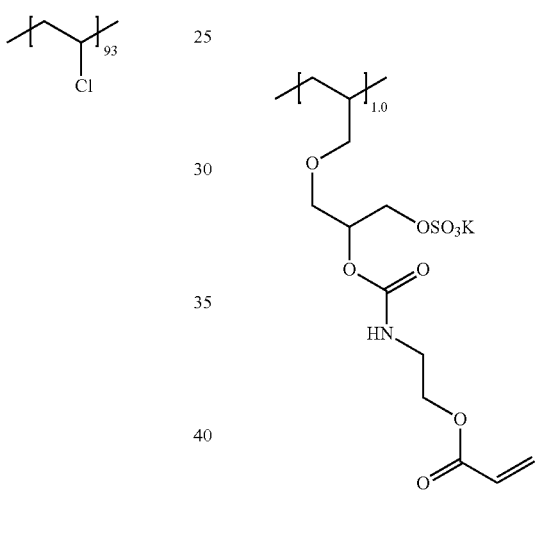
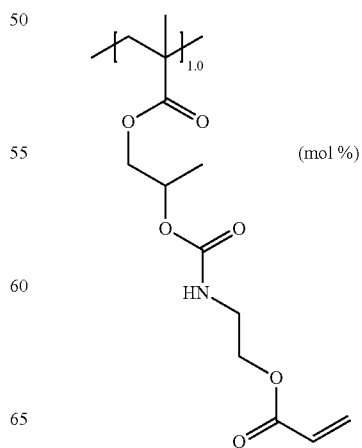
(mol %)

(4)
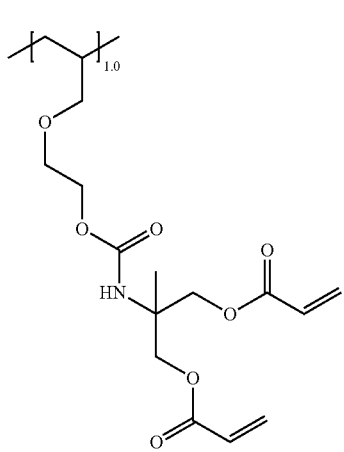 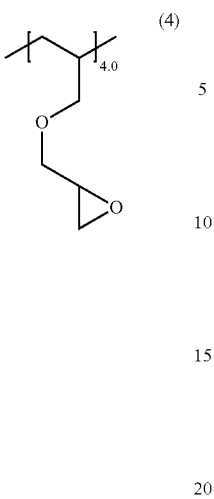
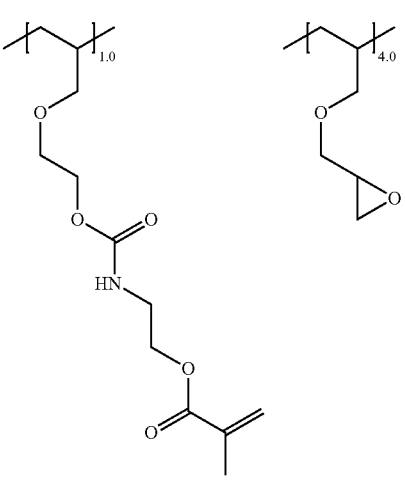
(5)
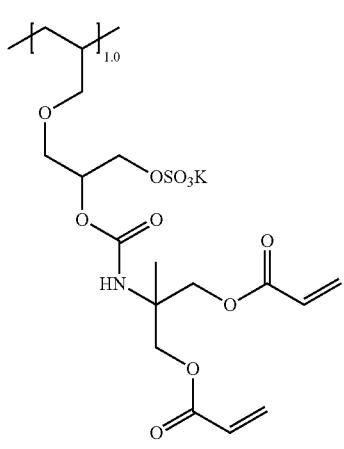
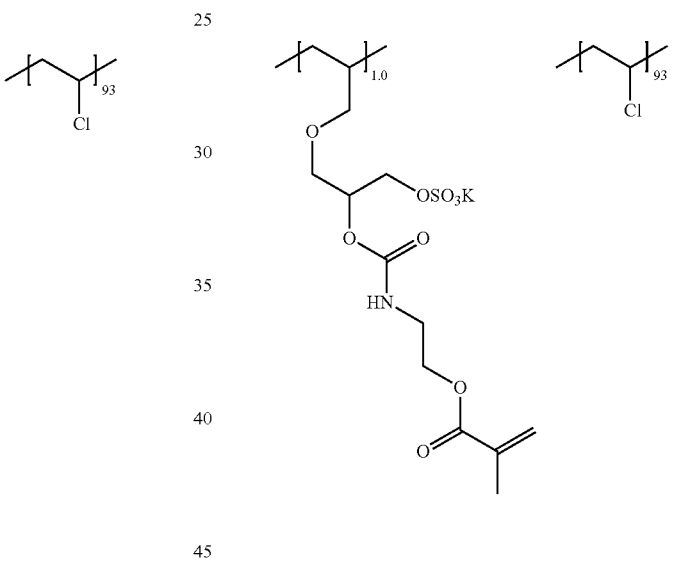
(mol %)
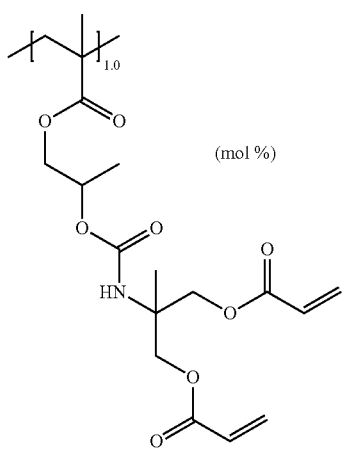
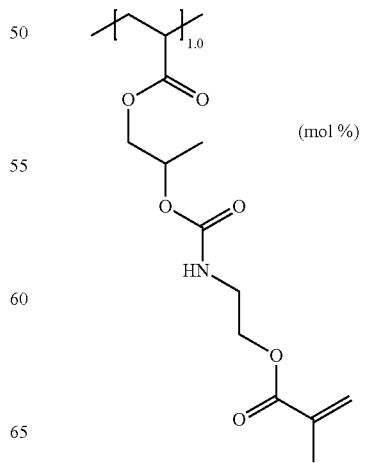
(mol %)

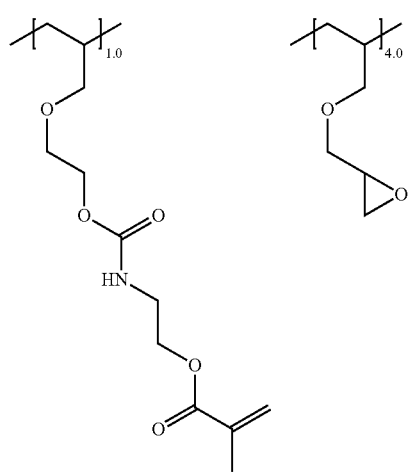
(6)
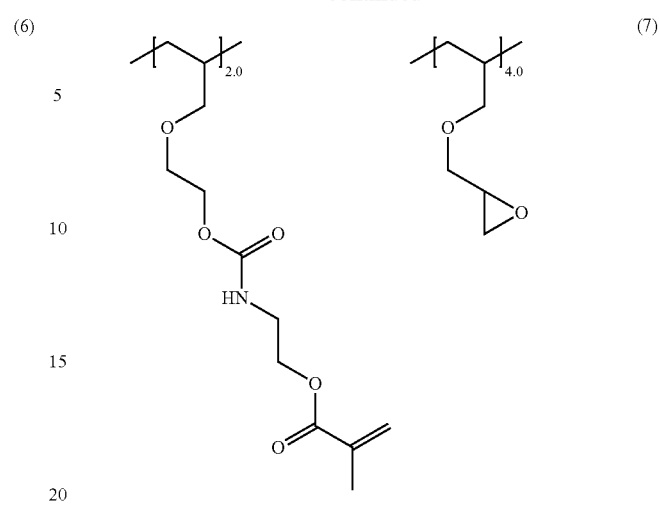
(7)
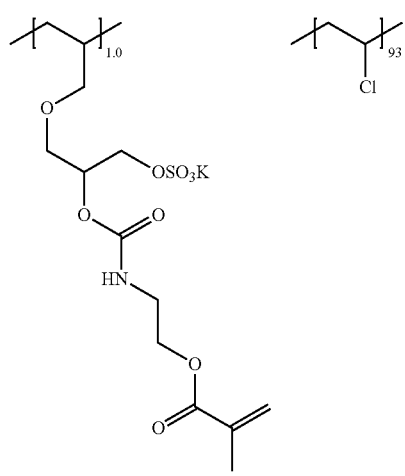
(mol %)
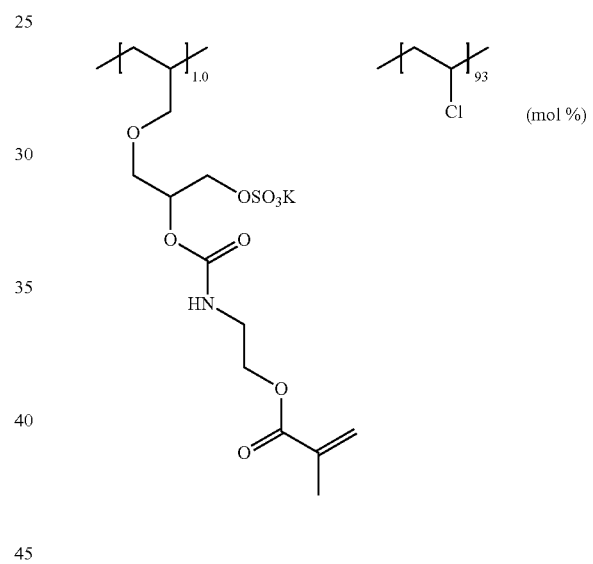
(mol %)
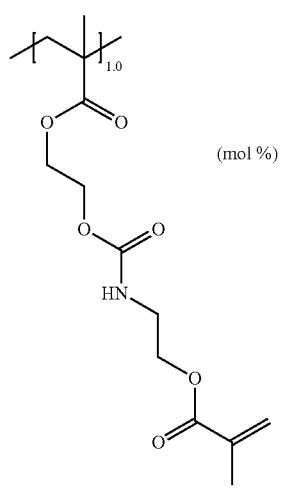
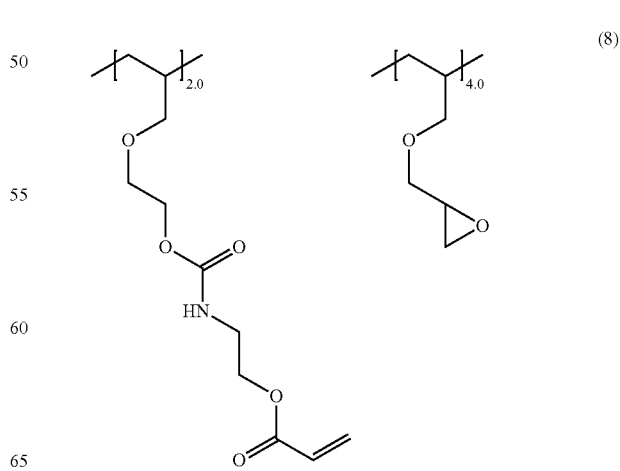
(8)

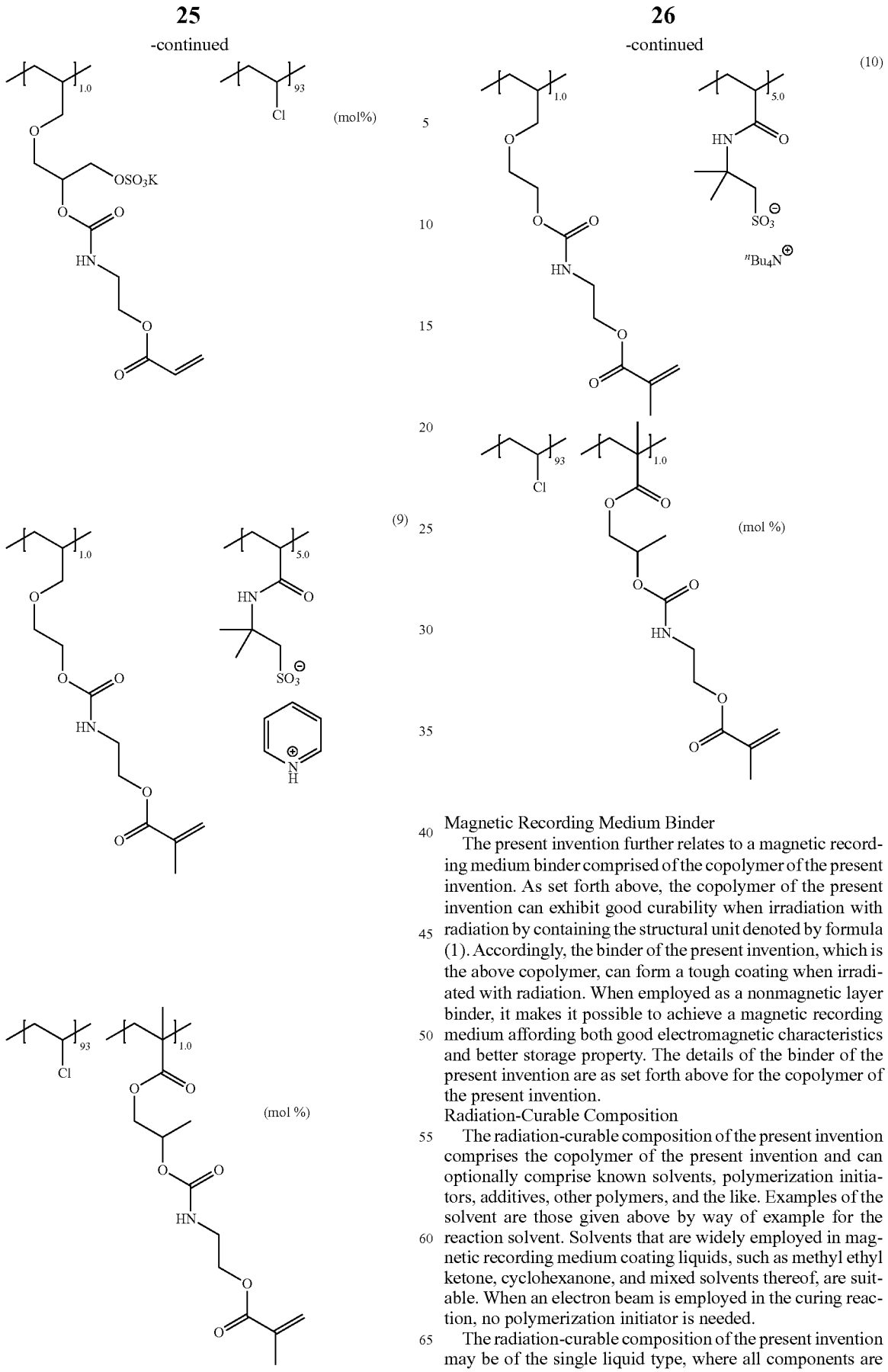

Magnetic Recording Medium Binder

The present invention further relates to a magnetic recording medium binder comprised of the copolymer of the present invention. As set forth above, the copolymer of the present invention can exhibit good curability when irradiation with radiation by containing the structural unit denoted by formula (1). Accordingly, the binder of the present invention, which is the above copolymer, can form a tough coating when irradiated with radiation. When employed as a nonmagnetic layer binder, it makes it possible to achieve a magnetic recording medium affording both good electromagnetic characteristics and better storage property. The details of the binder of the present invention are as set forth above for the copolymer of the present invention.

Radiation-Curable Composition

The radiation-curable composition of the present invention comprises the copolymer of the present invention and can optionally comprise known solvents, polymerization initiators, additives, other polymers, and the like. Examples of the solvent are those given above by way of example for the reaction solvent. Solvents that are widely employed in magnetic recording medium coating liquids, such as methyl ethyl ketone, cyclohexanone, and mixed solvents thereof, are suitable. When an electron beam is employed in the curing reaction, no polymerization initiator is needed.

The radiation-curable composition of the present invention may be of the single liquid type, where all components are contained in a single liquid; of the two-liquid type, where a first liquid and a second liquid are sequentially mixed during use; or of a multi-liquid type comprising three or more liquids. The radiation-curable composition of the present invention comprises the copolymer of the present invention, which is highly curable. Thus, a high-strength cured product can be formed by exposure to radiation. Accordingly, the radiation-curable composition of the present invention is suited to a variety of applications that require the formation of high-strength, cured products. Specifically, the radiation-curable composition of the present invention is desirably employed as a coating liquid to form the various layers, such as the magnetic layer and nonmagnetic layer, of a magnetic recording medium (a coating liquid for forming a magnetic recording medium), or for the preparation thereof.

Since the radiation-curable composition of the present invention contains the highly curable copolymer of the present invention, it can form a high-strength cured product when irradiated with radiation. To impart a suitable degree of flexibility to the cured product obtained, the incorporation of polyurethane resin is desirable. To cause the curing reaction to reach completion when irradiated with radiation, the polyurethane resin that is employed in combination is desirably one that comprises a radiation-curable functional group (a radiation-curable polyurethane resin).

An example of the radiation-curable polyurethane resin that is employed in combination is the polyurethane resin of which starting material is a sulfonic acid (salt) group-containing polyol compound that is described in detail in paragraphs [0015] to [0045] in Japanese Unexamined Patent Publication (KOKAI) No. 2009-96798.

The polyurethane resin that is obtained by employing a synthesis starting material in the form of a sulfonic acid (salt) group-containing polyol compound can contribute to enhancing dispersion because of its high adsorptivity to powders such as ferromagnetic powder and nonmagnetic powder. In contrast to the common polyurethane synthesis reaction, which is conducted in an organic solvent, a sulfonic acid (salt) group-containing polyol compound will normally exhibit poor reactivity due to low solubility in organic solvents. This is sometimes problematic in that it makes it difficult to obtain a polyurethane resin incorporating a desired quantity of sulfonic acid (salt) groups. By contrast, the sulfonic acid (salt) group-containing polyol compound described in Japanese Unexamined Patent Publication (KOKAI) No. 2009-96798 can exhibit high solubility in organic solvents. Thus, it is advantageous in that it readily permits the obtaining of a polyurethane resin incorporating a desired quantity of sulfonic acid (salt) groups. Further, the above polyurethane resin is also effective from the perspective of permitting the formation of a high-strength, flexible coating when employed in combination with the copolymer of the present invention.

For the details of the polyurethane resin employing a synthesis starting material in the form of the above-described sulfonic acid (salt) group, reference can be made to paragraphs [0046] to [0079] in Japanese Unexamined Patent Publication (KOKAI) No. 2009-96798. For the synthesis method, reference can be made to Examples of the same publication. The content of Japanese Unexamined Patent Publication (KOKAI) No. 2009-96798 is expressly incorporated herein by reference in its entirety.

Additional examples of radiation-curable polyurethane resins that can be employed in combination are the radiation-curable polyurethane resins described in Japanese Patent No. 2,610,468 and Japanese Unexamined Patent Publication (KOKAI) Heisei No. 3-1727, which are expressly incorporated herein by reference in their entirety.

In the radiation-curable composition of the present invention, the copolymer of the present invention may constitute the entire radiation-curable resin component. When employed in combination with another radiation-curable resin, from the perspective of forming a high-strength cured product, the copolymer of the present invention desirably constitutes equal to or more than 10 weight percent, preferably equal to or more than 20 weight percent, of the radiation-curable resin components.

When producing a particulate magnetic recording medium in large quantity, the coating liquid is sometimes stored for an extended period of a half a year or more, for example. However, vinyl chloride binders generally have poor stability. In particular, when a radiation-curable vinyl chloride binder is employed, the phenomenon of a marked drop in the stability of the coating liquid is sometimes observed. This is attributed to a change in molecular weight due to reaction of the radiation-curable functional group during storage.

Additionally, the synthesis reaction of a radiation-curable resin is normally conducted in the presence of a polymerization-inhibiting agent to protect the radiation-curable functional group. Accordingly, to inhibit reaction of the radiation-curable functional group during extended storage, it is conceivable to increase the quantity of the polymerization-inhibiting agent. However, simply increasing the quantity of polymerization-inhibiting agent may cause a drop in curability during irradiation with radiation and may run the risk of making it difficult to obtain a tough coating.

By contrast, research conducted by the present inventors has revealed that by storing the copolymer of the present invention in the presence of a benzoquinone compound, it is possible to maintain good long-term storage stability without losing curability. Accordingly, the radiation-curable composition of the present invention desirably comprises a benzoquinone compound.

The benzoquinone compound is a compound comprising a benzoquinone skeleton. The benzoquinone skeleton contained therein can be the o-benzoquinone skeleton or p-benzoquinone skeleton indicated below.

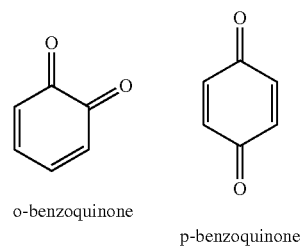 [SMILES: O=C1C=CC=CC1=O ; O=C1C=CC(=O)C=C1]

o-benzoquinone p-benzoquinone

From the perspective of availability, the benzoquinone skeleton is desirably a compound comprising a p-benzoquinone skeleton. The benzoquinone skeleton in the benzoquinone compound may be substituted or unsubstituted. Examples of substituents (which may themselves be substituted) are alkyl groups, alkoxyl groups, hydroxyl groups, halogen atoms, aryl groups, cyano groups, nitro groups, and any of the substituents contained in Example compounds indicated below. Further, the benzoquinone compound employed may have one, two, or more benzoquinone skeletons. Example compounds given below are examples of desirable benzoquinone compounds.

(1) [benzoquinone structure]

(2) [2,3-dicyano-5,6-dichloro-benzoquinone structure]

(3) [methyl dimethoxy benzoquinone structure]

(4) [2,5-di-tert-amyl benzoquinone structure]

(5) [2,5-di-tert-butyl benzoquinone structure]

(6) [2,5-dibromo benzoquinone structure]

(7) [2,5-dichloro benzoquinone structure]

(8) [2,5-dihydroxy benzoquinone structure]

(9) [2,5-dimethoxy benzoquinone structure]

(10) [2,5-diphenyl benzoquinone structure]

(11) [2,6-di-tert-butyl benzoquinone structure]

(12) [2,6-dichloro benzoquinone structure]

(13) [2,6-dimethoxy benzoquinone structure]

(14) [2,6-dimethyl benzoquinone structure]

(15) [2-bromo benzoquinone structure]

-continued
(16)
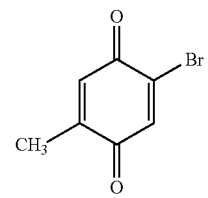
(17)
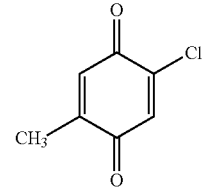
(18)
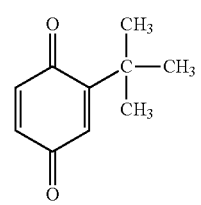
(19)
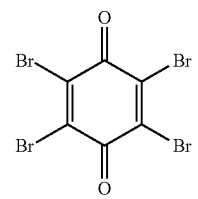
(20)
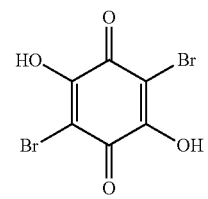
(21)
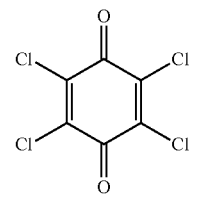
(22)
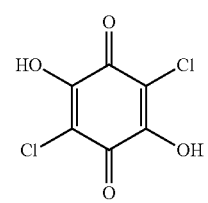
(23)
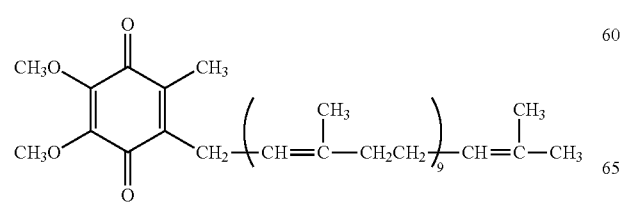
-continued
(24)
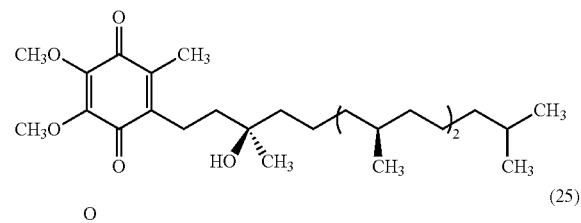
(25)
(26)
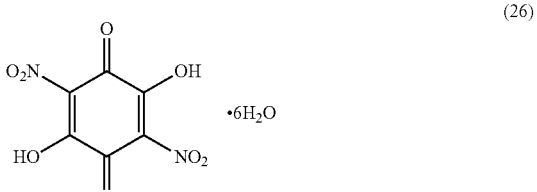
$\cdot 6H_2O$
(27)
(28)
(29)
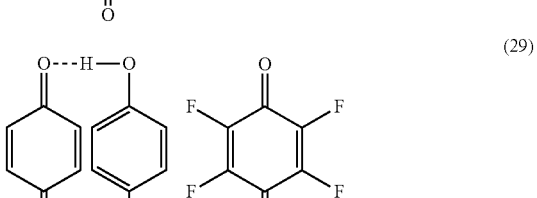
(30)
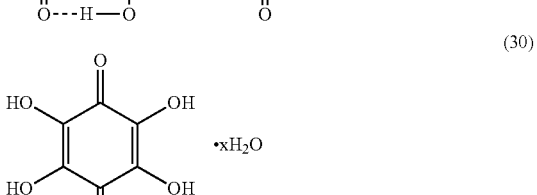
$\cdot xH_2O$
(31)
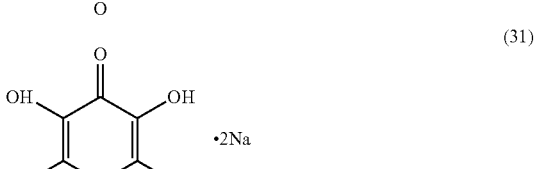
$\cdot 2Na$ (32)

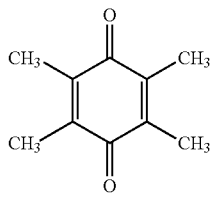

(33)

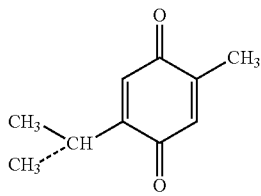

Of the above Example Compounds, Example Compounds (1) to (22) and (25) to (33) are desirable; (1) to (22), (25) to (28), (30), (32), and (33) are preferred; and compounds (1) to (22), (25) to (28), (30), and (32) are of greater preference.

The resin composition of the present invention can contain a single benzoquinone compound, or a combination of two or more such compounds. From the perspective of achieving both stability and curability, the content of the benzoquinone compound (the combined quantities of multiple benzoquinone compounds when multiple such compounds are employed) in the resin composition of the present invention is desirably equal to or higher than 1 ppm but equal to or lower than 500,000 ppm, preferably equal to or higher than 1 ppm but equal to or lower than 400,000 ppm, and more preferably, equal to or higher than 100 ppm but equal to or lower than 100,000 ppm, based on the copolymer of the present invention (the solid component).

The radiation-curable composition of the present invention can comprise at least one compound selected from the group consisting of phenol compounds, piperidine-1-oxyl compounds, nitro compounds, and phenothiazine compounds. By employing one or more of these compounds, desirably in combination with the benzoquinone compound described above, it is possible to maintain good long-term storage stability without losing curability.

Details of the above-described compounds that can be employed as optional components will be described below.

The phenol compound is not specifically limited other than that it be a compound comprising a hydroxyphenyl group. The hydroxyphenyl group may comprise a substituent. Examples of the substituent are an alkyl group, alkoxy group, and hydroxyl group. The phenol compound may comprise multiple substituted or unsubstituted hydroxybenzene skeletons (polyphenol compounds). The polyphenol compound is not specifically limited. From the perspectives of availability and effect, bisphenol A, tradename Irgacure 1010 (made by Ciba Specialty Chemicals Corporation) or the like is desirable. Desirable examples of the phenol compound employed in combination are p-methoxyphenol, hydroquinone, polyphenol compounds, and 2,6-di-t-butyl-p-cresol. The phenol compound may be employed singly, or two or more such phenol compounds may be employed in combination.

The piperidine-1-oxyl compound referred to in the present invention means a compound having the piperidine-1-oxyl structure indicated below.

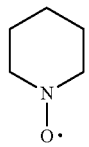

The piperidine-1-oxyl compound can be in the form of a compound comprising a substituted piperidine-1-oxyl skeleton, or an unsubstituted piperidine-1-oxyl compound. Examples of the substituents are alkyl groups, alkoxy groups, amino groups, carboxyl groups, cyano groups, hydroxyl groups, isothiocyanate groups, optionally substituted alkylcarbonylamino groups, arylcarbonyloxy groups, piperidyl ring carbon-containing carbonyl groups, and other substituents contained in Example compounds indicated below. A piperidine-1-oxyl group comprising one piperidine-1-oxyl skeleton or two or more such skeletons may be employed. Examples of desirable piperidine-1-oxyl compounds are Example compounds (1-a) to (1-l) below. Of these, Example compounds (1-f), (1-j), (1-l), (1-b), and (1-k) are desirable, and (1-f), (1-j), (1-l), and (1-b) are preferably, and (1-f), (1-j), and (1-l) are of greater preference.

(1-a)

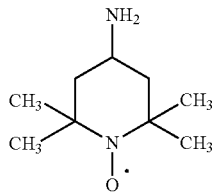

(1-b)

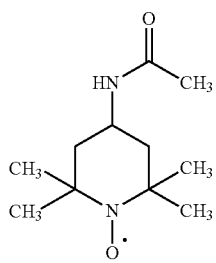

(1-c)

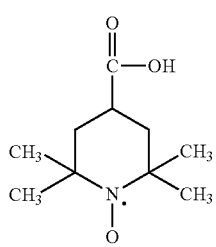

(1-d)

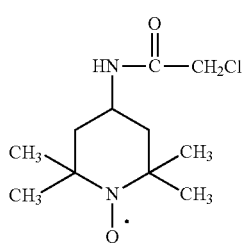

-continued (1-e) 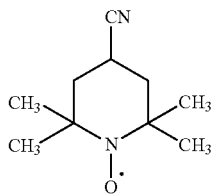

(1-f) 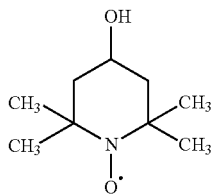

(1-g) 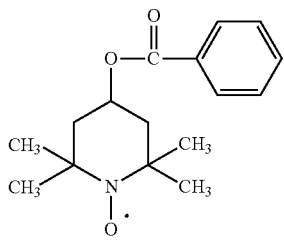

(1-h) 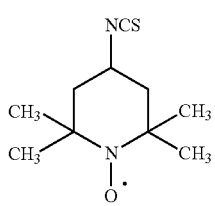

(1-i) 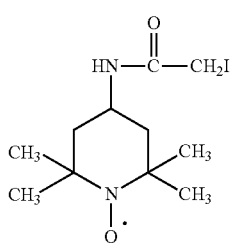

(1-j) 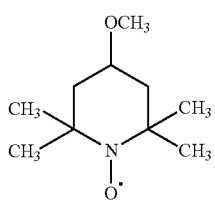

(1-k) 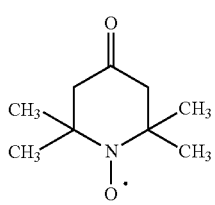

-continued (1-l) 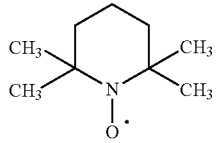

The nitro compound is not specifically limited other than that it be a compound comprising a nitro group denoted by R—NO$_2$. In this formula, the R moiety is, for example, an aryl group (desirably an aryl group having 6 to 10 carbon atoms, such as a phenyl group) or an alkyl group (desirably an alkyl group having 1 to 12 carbon atoms, such as a methyl group, ethyl group, propyl group, isopropyl group, linear or branched butyl group, linear or branched amyl group, linear or branched hexyl group, linear or branched heptyl group, linear or branched octyl group, linear or branched nonyl group, linear or branched decyl group, linear or branched undecyl group, or linear or branched dodecyl group, and optionally comprising a hetero atom). From the perspective of availability, nitrobenzene and nitromethane are preferred.

The term "phenothiazine compound" means a compound having the phenothiazine skeleton indicated below.

The phenothiazine skeleton contained in the phenothiazine compound may be substituted or unsubstituted. Examples of substituents are halogen atoms, optionally substituted amino groups, alkoxy groups, alkylthio groups, acyl groups, arylcarbonyl groups, trihalomethyl groups, and any of the other substituents contained in Example compounds indicated below.

A phenothiazine compound having one, two, or more phenothiazine skeletons may be employed. Example compounds (4-a) to (4-g) are examples of desirable phenothiazine compounds. Of these, Example compounds (4-b), (4-c), (4-d), (4-e), (4-f), and (4-g) are preferred, (4-b), (4-c), (4-d), (4-e), and (4-f) are of greater preference, and (4-c), (4-d), (4-e), and (4-f) are of even greater preference.

(4-a)

(4-b)

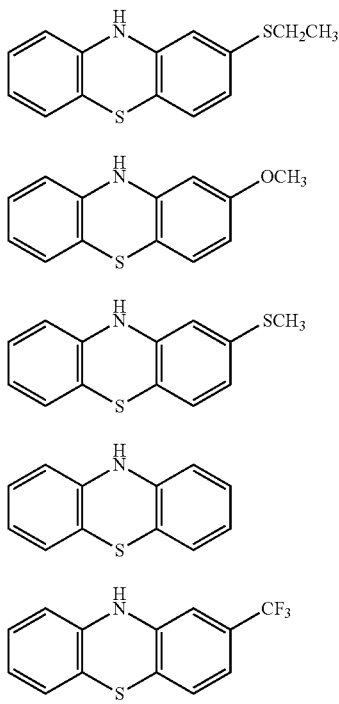

From the perspective of achieving both long-term storage stability and curability, the content of the phenol compounds, piperidine-1-oxyl compounds, nitro compounds, and phenothiazine compounds in the radiation-curable composition of the present invention (the total quantity when multiple such compounds are employed in combination) is desirably equal to or higher than 1 ppm and equal to or lower than 500,000 ppm, preferably equal to or higher than 1 ppm and equal to or lower than 400,000 ppm, and more preferably, equal to or higher than 1 ppm and equal to or lower than 300,000 ppm, based on the copolymer of the present invention (the solid component).

The solid component concentration in the radiation-curable composition of the present invention is not specifically limited. 10 weight percent or higher is desirable, and 100 percent of the solid component is acceptable. From the perspectives of storage stability and ease of handling, a solid component concentration of about 10 to 80 weight percent is desirable, and about 20 to 60 weight percent is preferable.

The above-described compounds such as benzoquinone compounds can be added to a composition containing the copolymer of the present invention, or can be simultaneously or successively added to the composition containing the starting material compounds of the copolymer of the present invention. The above-described compounds such as benzoquinone compounds are desirably present in reaction systems in which the component containing a radiation-curable functional group is present, such as the synthesis reaction of the radiation-curable vinyl chloride copolymer and the reaction introducing a radiation-curable functional group into the vinyl chloride copolymer. The compounds that are added to the reaction can play the role of inhibiting the radiation-curable functional groups from reacting during the reaction without loss of curability when irradiated with radiation.

The various above-described components that are contained in the radiation-curable composition of the present invention can be synthesized by known methods or the above-described methods, or procured as commercial products.

Cured Product

The present invention further relates to a cured product obtained by radiation-curing the radiation-curable composition of the present invention. The cured product of the present invention is desirably incorporated into a magnetic recording medium as a cured film (radiation-cured layer). To form the above cured film, the radiation-curable composition of the present invention that is employed can be prepared by admixing with the above components various components commonly employed in coating liquids used to form magnetic recording media, such as ferromagnetic powders, nonmagnetic powders, and various additives. For the details, the magnetic recording medium of the present invention is as set forth further below. For example, an electronic beam or ultraviolet radiation can be employed as the radiation that is irradiated for the curing reaction. The use of an electron beam is desirable in that a polymerization initiator is unneeded. Irradiation with radiation can be conducted by a known method. For the details, reference can be made to paragraphs [0021] to [0023] in Japanese Unexamined Patent Publication (KOKAI) No. 2009-134838, for example. The content of the above publication is expressly incorporated herein by reference in its entirety. Known techniques, such as those described in "UV and EB Curing Techniques" (published by the Sogo Gijyutsu Center (Ltd.)) and "Applied Techniques of Low-Energy Electron Beam Irradiation" (2000, published by CMC (Ltd.)), can be employed for the radiation curing device and the radiation irradiation curing method. The contents of the above publications are expressly incorporated herein by reference in their entirety.

Magnetic Recording Medium

The magnetic recording medium of the present invention comprises a magnetic layer comprising a ferromagnetic powder and a binder on a nonmagnetic support, and comprises at least one radiation-cured layer obtained by radiation-curing a coating layer comprising the radiation-curable vinyl chloride copolymer of the present invention, that is, comprises at least one radiation-cured layer obtained by radiation-curing a coating layer comprising the radiation-curable composition of the present invention.

The radiation-cured layer can be the magnetic layer, for example. When there is a nonmagnetic layer containing a nonmagnetic powder and a binder between the nonmagnetic support and the magnetic layer, the magnetic layer and/or the nonmagnetic layer can be the radiation-cured layer in the magnetic recording medium of the present invention. Since the coating layer contains the copolymer of the present invention with high curability, it can be made to undergo a good curing reaction by being irradiated with radiation, thereby forming a high-strength radiation-cured layer.

The magnetic recording medium of the present invention will be described in greater detail below.

Binder

The radiation-curable vinyl chloride copolymer of the present invention is an example of a binder that can be employed to form a magnetic layer or nonmagnetic layer. Other binders can be employed in combination with the radiation-curable vinyl chloride copolymer of the present invention as the binder used to form the magnetic layer and/or nonmagnetic layer. Examples of binders that can be employed in combination are vinyl chloride resins excluding the vinyl chloride copolymer of the present invention, polyurethane resins, radiation-curable polyurethane resins, polyester resins, polyamide resins, acrylic resins in which styrenes, acrylonitriles, methyl methacrylates or the like are copolymerized, nitrocellulose, other cellulose resins, epoxy resins, phenoxy resins, polyvinyl acetals, polyvinyl butyrals, and other polyvinyl alkylal resins. Desirable examples of binders employed in combination with the radiation-curable vinyl chloride copolymer of the present invention are the radiation-curable polyurethane resins described in above-cited Japanese Unexamined Patent Publication (KOKAI) No. 2009-96798.

When the magnetic recording medium of the present invention comprises a layer formed without the use of the radiation-curable vinyl chloride copolymer of the present invention, the above binders can be employed as the binder in such a layer, for example. Desirable binders among those listed above are polyurethane resins, acrylic resins, cellulose resins, and vinyl chloride resin. Reference can be made to [0081] to [0094] in Japanese Unexamined Patent Publication (KOKAI) No. 2009-96798 for details regarding binder resins suitable for use in the magnetic recording medium of the present invention.

From the perspectives of achieving both a high fill rate of ferromagnetic powder and a strong magnetic layer, the content of the binder in the magnetic layer is desirably equal to or more than 5 weight parts and equal to or less than 30 weight parts, preferably equal to or more than 10 weight parts and equal to or less than 20 weight parts, per 100 weight parts of ferromagnetic powder. In layers in which the radiation-curable vinyl chloride copolymer of the present invention is employed as binder, the radiation-curable vinyl chloride copolymer of the present invention desirably constitutes equal to or more than 50 weight percent, preferably 60 to 100 weight percent, and more preferably, 70 to 100 weight percent of the total binder. The same applies to the quantity of binder employed in the nonmagnetic layer.

Magnetic Layer (i) Ferromagnetic Powder

The magnetic recording medium of the present invention comprises a ferromagnetic powder together with a binder, in the magnetic layer. Acicular ferromagnetic powder, platelike magnetic powder, spherical magnetic powder, or elliptical magnetic powder can be employed as the ferromagnetic powder. From the perspective of high-density recording, the average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

In order to improve the dispersibility of microparticulate ferromagnetic powder as described above, it is desirable to use the binder containing polar groups such as those described above. From this perspective, it is preferable to use the binder in the form of the radiation-curable vinyl chloride copolymer containing the sulfonic acid (salt) group, for example.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798 for the details of the above-described magnetic powders.

(ii) Additives

Additives may be added to the magnetic layer as needed. Examples of such additives are: abrasives, lubricants, dispersing agents, dispersing adjuvants, antifungal agents, antistatic agents, oxidation inhibitors, and solvents. Reference can be made to [0111] to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 m$^2$/g (more preferably 150 to 400 m$^2$/g), the DBP oil absorption capacity is 20 to 400 ml/100 g (more preferably 30 to 200 ml/100 g), the particle diameter is 5 to 80 nm (more preferably 10 to 50 nm), the pH is 2 to 10, the moisture content is 0.1 to 10 percent, and the tap density is 0.1 to 1 g/ml. For example, the *Carbon Black Handbook* compiled by the Carbon Black Association, which is expressly incorporated herein by reference in its entirety, may be consulted for types of carbon black suitable for use in the magnetic layer. These carbon blacks are commercially available.

The types and quantities of the additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

A nonmagnetic layer comprising a nonmagnetic powder and a binder can be provided between the nonmagnetic support and magnetic layer in the magnetic recording medium of the present invention. To increase running durability, electromagnetic characteristics, and storage property, the nonmagnetic layer is desirably in the form of the above-described radiation-cured layer.

The nonmagnetic powder can be an organic or inorganic substance. Examples of inorganic substances are: metals, metal oxides, metal carbonates, metal sulfates, metal nitrides, metal carbides, and metal sulfides. Carbon black may also be employed. These nonmagnetic powders are commercially available and can be manufactured by known methods.

Specifically, titanium oxides such as titanium dioxide, cerium oxide, tin oxide, tungsten oxide, ZnO, ZrO$_2$, SiO$_2$, Cr$_2$O$_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, MgCO$_3$, CaCO$_3$, BaCO$_3$, SrCO$_3$, BaSO$_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic recording medium of the present invention.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$, desirably 30 to 50 kg/mm$^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 m$^2$/g, preferably 150 to 400 m$^2$/g. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto. As described above, the binder of the nonmagnetic layer is desirably the radiation-curable vinyl chloride copolymer of the present invention.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 3 to 10 nm, as a center average roughness Ra at a cutoff value of 0.25 mm.

Smoothing Layer and Adhesive Layer

A smoothing layer may be provided in the magnetic recording medium of the present invention. A smoothing layer is a layer that buries protrusions on the surface of the nonmagnetic support. In a magnetic recording medium in which a magnetic layer is provided on a nonmagnetic support, the smoothing layer can be provided between the nonmagnetic support and the magnetic layer. In a magnetic recording medium in which a nonmagnetic layer and a magnetic layer are sequentially provided on a nonmagnetic support, the smoothing layer can be provided between the nonmagnetic support and the nonmagnetic layer.

The smoothing layer can be formed by curing the radiation-curable compound by irradiation with radiation. The term "radiation-curable compound" refers to a compound that has the property of beginning to polymerize or crosslink when irradiated with radiation in the form of ultraviolet radiation, an electron beam, or the like, increasing in molecular weight and curing. The radiation-curable composition of the present invention can be employed to form the smoothing layer.

Further, an adhesive layer can be provided on the coating surface on the side of the nonmagnetic support on which the magnetic layer is formed and/or on the side on which the backcoat layer is formed. The adhesive layer can be formed of a polyester resin that is soluble in solvent. The thickness is desirably about 0.01 to 0.2 µm.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, and the like can be employed as the particulate components. Resins such as nitrocellulose, phenoxy resin, vinyl chloride resin, and polyurethane can be employed singly or in combination as the binder. The radiation-curable composition of the present invention can be used to form the backcoat layer.

Layer Structure

In the magnetic recording medium of the present invention, the thickness of the nonmagnetic support desirably ranges from 3 to 80 µm. When the above smoothing layer is provided between the nonmagnetic support and the nonmagnetic layer or the magnetic layer, the thickness of the smoothing later desirably ranges from 0.01 to 0.8 µm, and preferably 0.02 to 0.6 µm. The thickness of the above backcoat layer is, for example, 0.1 to 1.0 µm, and desirably 0.2 to 0.8 µm.

The thickness of the magnetic layer is desirably optimized based on the saturation magnetization of the head employed, the length of the head gap, and the recording signal band, and is normally 0.01 to 0.10 µm, preferably 0.02 to 0.08 µm, and more preferably, 0.03 to 0.08 µm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 µm, preferably 0.3 to 2.5 µm, and further preferably, 0.4 to 2.0 µm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Manufacturing Method

The steps for manufacturing coating liquids for forming the various layers such as the magnetic layer and the nonmagnetic layer desirably include at least a kneading step, dispersing step, and mixing steps provided as needed before and after these steps. Each of these steps may be divided into two or more stages. All of the starting materials such as the ferromagnetic powder, nonmagnetic powder, binder, carbon black, abrasives, antistatic agents, lubricants, solvents and the like that are employed in the present invention can be added at the beginning or part way through any of the steps. Individual starting materials can be divided into smaller quantities and added in two or more increments. For example, the polyurethane can be divided into small quantities and incorporated during the kneading step, dispersing step, and after the dispersing step to adjust the viscosity. The above starting materials can be added simultaneously or successively to the radiation-curable composition of the present invention to prepare coating liquids. For example, the powder components such as the ferromagnetic powder and nonmagnetic powder can be pulverized in a kneader, the radiation-curable composition of the present invention can be added to conduct the kneading step, various additives can be added to the kneaded product, and dispersion can be conducted to prepare a coating liquid.

To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

In the method for manufacturing a magnetic recording medium of the present invention, for example, a nonmagnetic layer coating liquid can be applied to a prescribed film thickness on the surface of a nonmagnetic support while running to form a nonmagnetic layer. Subsequently, a magnetic layer coating liquid can be applied to a prescribed film thickness thereover to form a magnetic layer. Multiple magnetic layer coating liquids can be successively or simultaneously applied in multiple layers, or the nonmagnetic layer coating liquid and the magnetic layer coating liquid can be successively or simultaneously applied in multiple layers. As set forth above, when the lower layer (nonmagnetic layer) coating liquid and the upper layer (magnetic layer) coating liquid are sequentially applied in multiple layers, some of the nonmagnetic layer sometimes dissolves into the solvent contained in the magnetic layer coating liquid. In that case, when the nonmagnetic layer is formed as a radiation-cured layer, since the radiation-curable component in the nonmagnetic layer is polymerized or crosslinked, increasing in molecular weight, when irradiated with radiation, its dissolution into the solvent contained in the magnetic layer coating liquid can be inhibited or reduced. Accordingly, when sequentially applying the lower layer (nonmagnetic layer) coating liquid and the upper layer (magnetic layer) coating liquid in multiple layers, it is desirable to conduct irradiation with radiation before coating the upper layer (magnetic layer) coating liquid, and then form the magnetic layer over the cured nonmagnetic layer. However, when the curability of the radiation-curable resin employed in the nonmagnetic layer is inadequate, it is difficult to adequately inhibit dissolution of the nonmagnetic layer. By contrast, the radiation-curable vinyl chloride copolymer of the present invention can exhibit high curability. Thus, by employing a radiation-cured layer formed of the radiation-curable composition of the present invention as the nonmagnetic layer, it is possible to inhibit the dissolution of the nonmagnetic layer into the magnetic layer coating liquid. This can effectively enhance the electromagnetic characteristics. The fact that the curability of the nonmagnetic layer is high is advantageous in improving the storage property of the medium, as set forth above. The use of a radiation-cured layer formed of the radiation-curable composition of the present invention as the nonmagnetic layer is desirable from this perspective, as well.

The coating machine used to apply the magnetic layer coating liquid or nonmagnetic layer coating liquid can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines. In the course of forming a radiation-cured layer, the coating layer that has been formed by coating the coating liquid is irradiated with radiation to cure it. The details of the processing by irradiation with radiation are as set forth above. Following the coating step, the medium can be subjected to various post-processing, such as processing to orient the magnetic layer, processing to smoothen the surface (calendering), and thermoprocessing to reduce heat contraction. Reference can be made to [0146] to [0148] of Japanese Unexamined Patent Publication (KOKAI) No. 2009-96798, for example, with regard to this processing. The magnetic recording medium that is obtained can be cut to prescribed size with a cutter, puncher, or the like for use.

Physical Characteristics

The saturation magnetic flux density of the magnetic layer preferably ranges from 100 to 300 mT (1,000 to 3,000 G). The coercivity (Hr) of the magnetic layer is preferably 143.3 to 318.4 kA/m (1,800 to 4,000 Oe), more preferably 159.2 to 278.6 kA/m (2,000 to 3,500 Oe). Narrower coercivity distribution is preferable. The SFD and SFDr are preferably equal to or lower than 0.6, more preferably equal to or lower than 0.2.

The coefficient of friction of the magnetic recording medium of the present invention relative to the head is desirably equal to or less than 0.50 and preferably equal to or less than 0.3 at temperatures ranging from −10° C. to 40° C. and humidity ranging from 0 percent to 95 percent, and the charge potential preferably ranges from −500 V to +500 V. The modulus of elasticity at 0.5 percent extension of the magnetic layer preferably ranges from 0.98 to 19.6 GPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 0.98 to 14.7 GPa (100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) of the magnetic layer and the nonmagnetic layer is preferably within the desirable range described above for the coating. The loss elastic modulus preferably falls within a range of $1\times10^7$ to $8\times10^8$ Pa ($1\times10^8$ to $8\times10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

The radiation-curable resin has the property of polymerizing or crosslinking when irradiated with radiation to form a polymer and thus cure. The curing reaction proceeds by irradiation with radiation, so the coating liquid containing the radiation-curable resin is of a relatively low viscosity that remains stable so long as it is not irradiated with radiation. Thus, the coarse protrusions of the support surface can be covered (masked) by the leveling effect until the coating layer is cured. Accordingly, forming a radiation-cured layer can yield a magnetic recording medium of good surface smoothness and good high-density recording and reproduction characteristics. Employing a binder containing a polar group as the binder component as set forth above can increase the dispersibility of powder components such as the ferromagnetic powder and contribute to enhancing the surface smoothness of the magnetic layer. In addition, as set forth above, when successively coating the lower layer (nonmagnetic layer) coating liquid and upper layer (magnetic layer) coating liquid in multiple layers, the decrease in smoothness of the magnetic layer due to dissolution of the nonmagnetic layer can be inhibited by forming a nonmagnetic layer as a radiation-cured layer formed of the radiation-curable composition of the present invention.

In the magnetic recording medium of the present invention, the center surface roughness Ra of the magnetic layer as measured with a digital optical profilometer (TOPO-3D made by WYKO) is desirably equal to or lower than 4.0 nm, preferably equal to or lower than 3.0 nm, and more preferably, equal to or lower than 2.0 nm. The maximum height of the magnetic layer $SR_{max}$ is desirably equal to or lower than 0.5 μm, the ten point average roughness $SR_z$ is desirably equal to or lower than 0.3 μm, and the center surface peak height $SR_p$ is desirably equal to or lower than 0.3 μm. The center surface valley depth $SR_v$ is desirably equal to or lower than 0.3 μm, the center surface area ratio $SS_r$ is desirably 20 to 80 percent, and the average wavelength $S\lambda a$ is desirably 5 to 300 μm. The number of surface protrusions on the magnetic layer with a height of 0.01 to 1 μm can be optionally set to within a range of 0 to 2,000, which is desirable to optimize electromagnetic characteristics and the coefficient of friction. These can be readily controlled by controlling the surface properties by means of the support filler, the particle diameter and quantity of powder that is added to the magnetic layer, the roll surface shape of the calender, and the like. Curling is desirably kept to within ±3 mm.

In the magnetic recording medium of the present invention, physical properties of the nonmagnetic layer and magnetic layer may be varied based on the objective. For example, the modulus of elasticity of the magnetic layer may be increased to improve storage stability while simultaneously employing a lower modulus of elasticity than that of the magnetic layer in the nonmagnetic layer to improve the head contact of the magnetic recording medium.

The head used to reproduce the signal that is magnetically recorded on the magnetic recording medium of the present invention is not specifically limited. An MR head is desirably employed for high-sensitivity reproduction of signals recorded at high density. The MR head that is employed as the reproduction head is not specifically limited. For example, AMR heads, GMR heads, and TMR heads may be employed. The head employed for magnetic recording is not specifically limited. However, the saturation magnetization level of the recording head is desirably equal to or higher than 1.0 T, preferably equal to or higher than 1.5 T, for high-density recording.

EXAMPLES

The present invention will be described in detail below based on Examples. However, the present invention is not limited to the examples. The "parts" and "percent" given in Examples are weight parts and weight percent unless specifically stated otherwise.

1. Preparation and Evaluation of the Radiation-Curable Vinyl Chloride Copolymer and Radiation-Curable Composition

Example 1

(1) Polymerization of the Vinyl Chloride Copolymer

Vinyl chloride: 100 parts
Allyl glycidyl ether: 11.9 parts
2-Hydroxypropyl methacrylate: 4.1 parts
Allyl-2-hydroxyethyl ether: 3.6 parts
Sodium lauryl sulfate: 0.8 part
Water: 117 parts
were charged and the mixture was stirred at 50° C.
Subsequently,
Potassium persulfate: 0.6 part
was charged and emulsion polymerization was begun. After reacting for 10 hours, cooling was conducted when the pressure in the polymerization vessel reached 2 kg/cm². The unreacted vinyl chloride was recovered and the product was drained, washed, and dried, yielding vinyl chloride copolymer (1) with a copolymerization ratio (mol percent) of:
Vinyl chloride: 93.0 mole percent
Allyl glycidyl ether: 4.0 mole percent
2-Hydroxypropyl methacrylate: 1.0 mole percent
Allyl-2-hydroxyethyl ether: 1.0 mole percent
Units in which the epoxy group of the allyl glycidyl ether had been opened by sulfuric acid: 1.0 mole percent (2) Radiation-Curable Functional Group-Introducing Reaction To a two-liter flask were added 416 g (solid component 124.8 g) of a 30 percent cyclohexanone solution of vinyl chloride copolymer (1) and stirring was conducted at a rate of 210 rpm. Next, 0.28 g (2.60 mmol, 20,000 ppm) of 1,4-benzoquinone was added, stirred, and dissolved.

Subsequently, a reaction catalyst in the form of 0.125 g of dibutyltin dilaurate was added and the mixture was heated to 40 to 50° C. and stirred. Next, a radiation-curable functional group introducing component in the form of 13.75 g (0.09 mol) of 2-methacryloyloxyethyl isocyanate (MOI, made by Showa Denko K.K.) was added dropwise over 30 minutes. Following the dropwise addition, the mixture was stirred for two hours at 40° C. and cooled to room temperature, yielding a resin solution (radiation-curable composition) comprising a vinyl chloride copolymer (Example Compound (1)) containing radiation-curable functional groups (methacryloyloxy groups).

The $^1$H NMR data and its assignments of the above vinyl chloride copolymer containing radiation-curable functional groups (methacryloyloxy groups) are given below. A 400 MHz NMR (AvanceII-400 made by Bruker) was employed for $^1$H NMR measurement in Examples.

Radiation-curable functional group-containing vinyl chloride copolymer (Example Compound (1)): $^1$H-NMR (DMSO-$d_6$) δ(ppm)=6.2-6.0 (peak of C=C double bond), 5.8-5.6 (peak of C=C double bond), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

The solid component of the resin solution obtained by the above process was 31.0 percent. Within one day of preparing the resin solution, the weight average molecular weight (Mw) and number average molecular weight (Mn) of the radiation-curable functional group-containing vinyl chloride copolymer contained in the solution were measured by the following method at Mw=51,000 and Mn=29,000. The glass transition temperature (Tg), sulfate group concentration, and methacryloyloxy group concentration of the radiation-curable functional group-containing vinyl chloride copolymer (Example Compound (1)) were measured by the following method at Tg=64° C., sulfate group concentration=70 mmol/kg, and methacryloyloxy group concentration=360 mmol/kg.

Example 2

With the exception that 2-(2-isocyanate ethyloxy)ethyl methacrylate (Karenz_MOI-EG made by Showa Denki K.K.) was employed instead of 2-methacryloyloxyethyl isocyanate in the radiation-curable functional group-introducing reaction of Example 1, a resin solution of radiation-curable functional group-containing vinyl chloride copolymer (Example Compound (2)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C=C double bond), 5.8-5.6 (peak of C=C double bond), 4.6-4.2 (br., m), 4.2-4.0 (br., m), 3.9-3.1 (br., m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 3

With the exception that 2-acryloyloxyethyl isocyanate (Karenz_AOI made by Showa Denki K.K.) was employed instead of 2-methacryloyloxyethyl isocyanate in the radiation-curable functional group-introducing reaction of Example 1, a resin solution of radiation-curable functional group-containing vinyl chloride copolymer (Example Compound (3)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 4

With the exception that 1,1-bis(acryloyloxymethyl)ethyl isocyanate (Karenz_BEI made by Showa Denki K.K.) was employed instead of 2-methacryloyloxyethyl isocyanate in the radiation-curable functional group-introducing reaction of Example 1, a resin solution of radiation-curable functional group-containing vinyl chloride copolymer (Example Compound (4)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 5

With the exception that 2-hydroxypropyl acrylate was employed instead of 2-hydroxypropyl methacrylate in the vinyl chloride copolymer polymerization of Example 1, a resin solution of radiation-curable functional group-containing vinyl chloride copolymer (Example Compound (5)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 6

With the exception that 2-hydroxyethyl methacrylate was employed instead of 2-hydroxypropyl methacrylate in the vinyl chloride copolymer polymerization of Example 1, a resin solution of radiation-curable functional group-containing vinyl chloride copolymer (Example Compound (6)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 7

With the exception that 2-hydroxypropyl methacrylate was not employed in the vinyl chloride copolymer polymerization of Example 1, a resin solution of radiation-curable functional group-containing vinyl chloride copolymer (Example Compound (7)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 8

With the exception that 2-hydroxypropyl methacrylate was not employed in the vinyl chloride copolymer polymerization and 2-acryloyloxyethyl isocyanate (Karen AOI made by Showa Denko K.K.) was employed instead of 2-methacryloyloxyethyl isocyanate in the radiation-curable functional group-introducing reaction, a resin solution of radiation-curable functional group-containing vinyl chloride copolymer (Example Compound (8)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 2.7-2.65 (br., s), 2.60-2.0 (m), 2.0-0.7 (br., m).

The average molecular weight, Tg, sulfate group concentration, and radiation-curable functional group concentration were measured in the same manner as in Example 1. The results are given in Table 1.

Example 9

With the exception that a pyridine salt of 2-acrylamide-2-methylpropanesulfonic acid was employed instead of allyl glycidyl ether in the vinyl chloride copolymer polymerization of Example 1, a resin solution of radiation-curable functional group-containing vinyl chloride copolymer (Example Compound (9)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=9.0-7.0 (br., m), 6.2-6.0 (peak of C═C double bond), 5.8-5.6 (peak of C═C double bond), 4.6-4.2 (br., m), 4.2-4.0 (br., m), 3.9-3.1 (m), 3.1-3.0 (br., s), 3.0-2.85 (br., m), 2.7-2.65 (br., s), 2.60-2.0 (m), 2.0-0.7 (br., m).

The average molecular weight, Tg, sulfonate group concentration, and radiation-curable functional group concentration were measured in the same manner as in Example 1. The results are given in Table 1.

Example 10

With the exception that a tetrabutylammonium salt of 2-acrylamide-2-methylpropanesulfonic acid was employed instead of allyl glycidyl ether in the vinyl chloride copolymer polymerization of Example 1, a resin solution of radiation-curable functional group-containing vinyl chloride copolymer (Example Compound (10)) was obtained by the same method as in Example 1. The $^1$H NMR data and its assignments of the radiation-curable functional group-containing vinyl chloride copolymer obtained are given below.

$^1$H-NMR (DMSO-$d_6$) δ(ppm)=6.2-6.0 (peak of C=C double bond), 5.8-5.6 (peak of C=C double bond), 4.6-4.2 (br., m), 4.2-4.0 (br., m), 3.9-3.1 (br., m), 3.1-3.0 (br., s), 3.0-2.85 (br., m), 2.7-2.65 (br., s), 2.60-2.0 (m), 2.0-0.7 (br., m).

The average molecular weight, Tg, sulfonate group concentration, and radiation-curable functional group concentration were measured in the same manner as in Example 1. The results are given in Table 1.

Example 11

With the exception that 1,4-benzoquinone was not added in the radiation-curable functional group-introducing reaction of Example 1, a resin solution of radiation-curable functional group-containing vinyl chloride copolymer (Example Compound (1)) was obtained by the same method as in Example 1. The average molecular weight, Tg, sulfate group concentration, and radiation-curable functional group concentration were measured in the same manner as in Example 1, producing the same measurement values as in Example 1.

Comparative Example 1

Synthesis of the radiation-curable vinyl chloride copolymer described in Japanese Unexamined Patent Publication (KOKAI) No. 2004-352804.

According to the method described in paragraphs [0040] to [0041] in Japanese Unexamined Patent Publication (KOKAI) No. 2004-352804, the resin (radiation-curable vinyl chloride copolymer) of Synthesis Example 1 of Japanese Unexamined Patent Publication (KOKAI) No. 2004-352804 was obtained. The radiation-curable functional group concentration was measured in the same manner as in Example 1, yielding the results are given in Table 1.

<Methods of Evaluating the Radiation-Curable Vinyl Chloride Copolymers>

(1) Measurement of Average Molecular Weight

The average molecular weight (Mw) of the radiation-curable functional group-containing vinyl chloride copolymers contained in the various resin solutions of Examples and Comparative Example were obtained by standard polystyrene conversion using gel permeation chromatography (GPC) with DMF solvent containing 0.3 percent lithium bromide.

(2) Sulfuric Acid (Salt) Concentration and Sulfonic Acid (Salt) Concentration

The quantity of elemental sulfur was determined from the area of the elemental sulfur (S) peak in X-ray fluorescence analysis, converted to the quantity of elemental sulfur per kilogram of radiation-curable functional group-containing vinyl chloride copolymer, and calculated as the sulfuric acid (salt) group or sulfonic acid (salt) group concentration in the radiation-curable functional group-containing vinyl chloride copolymer.

(3) Measurement of the Glass Transition Temperature (Tg)

Measurement was conducted by the viscoelasticity method with a Rheovibron made by Toyo Baldwin.

(4) Concentration of Radiation-Curable Functional Groups in the Copolymer

The content was calculated by the NMR integral ratio.

TABLE 1

| | Weight average molecular weight Mw | Tg (° C.) | Concentration of sulfate group or sulfonate group (mmol/kg) | Concentration of radiation-curable functional group (mmol/kg) |
|---|---|---|---|---|
| Ex. 1 | 51500 | 64 | 70 | 360 |
| Ex. 2 | 52000 | 64 | 70 | 360 |
| Ex. 3 | 51300 | 66 | 70 | 360 |
| Ex. 4 | 52000 | 63 | 70 | 720 |
| Ex. 5 | 53000 | 62 | 70 | 360 |
| Ex. 6 | 53000 | 62 | 70 | 360 |
| Ex. 7 | 52000 | 61 | 70 | 360 |
| Ex. 8 | 52000 | 60 | 70 | 360 |
| Ex. 9 | 53000 | 68 | 350 | 360 |
| Ex. 10 | 53000 | 68 | 350 | 360 |
| Ex. 11 | 51500 | 65 | 70 | 360 |
| Comp. Ex. 1 | — | — | — | 1283 |

<Methods of Evaluating the Resin Solutions (Radiation-Curable Compositions)>

(1) Evaluation of the Radiation Curability

The various resin solutions obtained in the Examples and Comparative Example were diluted to solid component concentrations of about 20 percent to prepare sample solutions. The sample solutions were coated on an aramid base with a blade (300 μm) and then dried for two weeks at room temperature, yielding coating films 30 to 50 μm in coating thickness.

Next, the coating films were irradiated three times with an electron beam at an intensity of 10 kG for a total of 30 kG using an electron beam irradiating apparatus.

The film that had been irradiated with the electron beam was then immersed in 100 mL of tetrahydrofuran (THF) and extracted for 2 hours at 60° C. Upon completion of the extraction, the film was washed with 100 mL of THF and vacuum dried for 3 hours at 140° C. Next, the weight of the remaining component (of the dried film) following extraction was adopted as the weight of the gel component, and the value calculated as (gel component/weight of coating film before extraction)×100 was adopted as the gel component ratio, as shown in Table 2. The higher the gel component ratio, the stronger the coating, and the better the radiation curing progressed.

(2) Evaluation of Long-Term Storage Stability

The resin solutions obtained in the Examples were stored under sealed conditions at 23° C. and the number of days required for the resin solutions to exhibit a change in molecular weight as measured by GPC was determined. The results are given in Table 3.

TABLE 2

| | Curability (gel component ratio) |
|---|---|
| Ex. 1 | 85% |
| Ex. 2 | 90% |

TABLE 2-continued

| | Curability (gel component ratio) |
|---|---|
| Ex. 3 | 90% |
| Ex. 4 | 95% |
| Ex. 5 | 85% |
| Ex. 6 | 85% |
| Ex. 7 | 80% |
| Ex. 8 | 80% |
| Ex. 9 | 75% |
| Ex. 10 | 75% |
| Ex. 11 | 90% |
| Comp. Ex. 1 | 65% |

TABLE 3

| | Storage stability |
|---|---|
| Ex. 1 | 250 days or more |
| Ex. 2 | 250 days or more |
| Ex. 3 | 250 days or more |
| Ex. 4 | 250 days or more |
| Ex. 5 | 250 days or more |
| Ex. 6 | 250 days or more |
| Ex. 7 | 250 days or more |
| Ex. 8 | 250 days or more |
| Ex. 9 | 250 days or more |
| Ex. 10 | 250 days or more |
| Ex. 11 | 14 days |

<Evaluation Results>

As shown in Table 2, the resin solutions of Examples 1 to 11 exhibited higher curability than the resin solution of Comparative Example 1. From this result, the radiation-curable vinyl chloride copolymer of the present invention was determined to be highly curable.

From the results in Table 3, the resin solutions (Examples 1 to 10) containing a benzoquinone compound with the radiation-curable vinyl chloride copolymer of the present invention exhibited excellent stability over time and were confirmed to have good long-term storage stability. Normally, curability drops when components that are capable of increasing long-term storage stability are added. However, in Examples 1 to 10 as shown in Table 2, the gel component ratio of the cured film obtained by irradiation with radiation was high and curability was good. This indicated that the use of a benzoquinone compound in the radiation-curable vinyl chloride copolymer of the present invention increased the storage stability without compromising curability.

2. Examples and Comparative Examples of the Magnetic Recording Medium

Reference Synthesis Example 1

Synthesis of Polyurethane Resin

To a reaction vessel equipped with thermometer, stirrer, Vigrue tube, and Liebig condenser were charged 190 parts of dimethyl terephthalate, 5.9 parts of dimethyl 5-sulfoisophthalate, 152 parts of propylene glycol, and 0.2 part of tetrabutoxytitanium and a transesterification reaction was conducted for 4 hours at 200 to 230° C. The temperature was then raised to 240° C. over 10 minutes while simultaneously gradually reducing the pressure. The mixture was reacted for 30 minutes and polymerization was halted, yielding polyester polyol (a).

One hundred parts of the polyester polyol (a) obtained were dissolved in 37 parts of methyl ethyl ketone (MEK) and 37 parts of toluene. To this were added 12 parts of 4,4'-diphenylmethane diisocyanate (MDI) and 1 part of neopentyl glycol. A 0.05 part quantity of catalyst in the form of dibutyltin dilaurate was added and the mixture was reacted for 5 hours at 80° C. The solution was then diluted with 94 parts of MEK and 94 parts of toluene, yielding a polyurethane resin (Tg=100° C., Mn=25,000, $SO_3Na$ group concentration=87 mmol/kg).

Reference Synthesis Example 2

Synthesis of Radiation-Curable Polyurethane Resin (1) Synthesis of Sulfonate Group-Containing Diol Compound To a flask were added 100 mL of distilled water, 50 g of taurine (0.400 mol), and 22.46 g of KOH made by Wako Pure Chemical Industries, Ltd. (87 percent purity). The internal temperature was raised to 50° C. and the contents were fully dissolved.

The internal temperature was then cooled to 40° C., 140.4 g (1.080 mols) of butyl glycidyl ether were added dropwise over 30 minutes, the temperature was raised to 50° C., and stirring was conducted for 2 hours. The solution was cooled to room temperature, 100 mL of toluene was added, the mixture was fractionated, and the toluene layer was discarded. Next, 400 mL of cyclohexanone was added, the temperature was raised to 110° C., and the water was removed with a Dean-Stark apparatus, yielding a 50 percent cyclohexanone solution of sulfonate group-containing diol compound. The $^1H$ NMR data of the product are given below. The NMR analysis revealed that the product was a mixture comprising Example Compound (S-31) described in Japanese Unexamined Patent Publication (KOKAI) No. 2009-96798, Example Compound (S-64) described in the same publication, and other compounds.

$^1$H NMR ($CDCl_3$): δ(ppm)=4.5 (br.), 3.95-3.80 (m), 3.50-3.30 (m), 3.25-2.85 (m), 2.65-2.5 (m), 2.45-2.35 (m), 1.6-1.50 (quintuplet), 1.40-1.30 (sextuplet), 1.00-0.90 (triplet).

(2) Preparation of Radiation-Curable Polyurethane Resin

To a flask were charged 57.50 g of the methyl oxirane adduct of 4,4'-(propane-2,2-diyl)diphenol (BPX-1000, weight average molecular weight 1,000, made by Adeka), 6.50 g of glycerol methacrylate (Bremmer GLM made by NOF Corporation), 10.50 g of dimethylol tricyclodecane (TCDM made by Oxea), 3.40 g of the sulfonate group-containing diol compound synthesized in (1) above, 107.66 g of cyclohexanone, and 0.24 g of benzoquinone. Next, a solution comprising 42.21 g of methylenebis(4,1-phenylene)=diisocyanate (MDI) (Millionate MT made by Nippon Polyurethane Industry Co., Ltd.) and 51.47 g of cyclohexanone was added dropwise over 15 minutes. Subsequently, 0.361 g of di-n-butyltin laurate was added, the temperature was raised to 80° C., and the mixture was stirred for 3 hours. When the reaction had ended, 121.28 g of cyclohexanone was added, yielding a polyurethane resin solution. The weight average molecular weight of the radiation-curable functional group-containing polyurethane resin in the resin solution obtained was measured by the same method as in Example 1 at 36,000. The sulfonate group concentration and radiation-curable functional group (methacryloyloxy group) concentration of the radiation-curable functional group-containing polyurethane resin contained in the resin solution obtained were measured by the same methods as in Example 1, yielding the following results: sulfonate group concentration=70 mmol/kg, methacryloyloxy group concentration=360 mmol/kg.

Reference Synthesis Example 3

Synthesis of Polyurethane Resin

To a reaction vessel equipped with thermometer, stirrer, Vigrue tube, and Liebig condenser were charged 190 parts of dimethyl terephthalate, 52 parts of propylene glycol, 50 parts of ethylene glycol, 50 parts of neopentyl glycol, and 0.2 part of tetrabutoxytitanium and a transesterification reaction was conducted for 4 hours at 200 to 230° C. The temperature was then raised to 240° C. over 10 minutes while simultaneously gradually reducing the pressure. The mixture was reacted for 30 minutes and polymerization was halted, yielding polyester polyol (b).

One hundred parts of the polyester polyol (b) obtained were dissolved in 37 parts of methyl ethyl ketone (MEK) and 37 parts of toluene. To this were added 12 parts of MDI. A 0.05 part quantity of catalyst in the form of dibutyltin dilaurate was added and the mixture was reacted for 5 hours at 80° C. The solution was then diluted with 94 parts of MEK and 94 parts of toluene, yielding a polyurethane resin (Tg=100° C., Mn=25,000, $SO_3Na$ group concentration=87 mmol/kg).

Example 12

(1) Preparation of Magnetic Layer Coating Liquid

Ferromagnetic metal powder: 100 parts
    Composition: Fe/Co=100/25
    Hc: 195 kA/m (about 2,450 Oe)
    Specific surface area by BET method: 65 m$^2$/g
    Surface treatment agents: $Al_2O_3$, $SiO_2$, $Y_2O_3$
    Particle size (major axis diameter): 38 nm
    Acicular ratio: 5
    σs: 110 A·m$^2$/kg (about 110 emu/g)
Vinyl chloride copolymer (MR104 made by Zeon Corporation): 10 parts
Polyurethane resin of Reference Synthesis Example 1: 10 parts (as solid component)
Methyl ethyl ketone: 150 parts
Cyclohexanone: 150 parts
α-$Al_2O_3$ (Mohs' hardness: 9, average particle diameter: 0.1 μm): 15 parts
Carbon black (average particle diameter: 0.08 μm): 0.5 part The various components described above were kneaded in an open kneader and dispersed in a sand mill. To the dispersion obtained were added:
Butyl stearate: 1.5 parts
Stearic acid: 0.5 part
Methyl ethyl ketone: 50 parts
Cyclohexanone: 50 parts
Toluene: 3 parts
Polyisocyanate compound (Coronate 3041, made by Nippon Polyurethane Industry Co., Ltd.): 5 parts The mixture was stirred for 20 minutes, ultrasonically processed, and filtered with a filter having an average pore diameter of 1 μm to prepare a magnetic layer coating liquid.

(2) Preparation of Nonmagnetic Layer Coating Liquid

Nonmagnetic powder (α$Fe_2O_3$ hematite): 80 parts
    Major axis length: 0.15 μm
    Specific surface area by BET method: 52 m$^2$/g
    pH: 6
    Tap density: 0.8
    DBP oil absorption capacity: 27 to 38 g/100 g
    Surface treatment agents: $Al_2O_3$, $SiO_2$
Carbon black: 20 parts
    Average primary particle diameter: 0.020 μm
    DBP oil absorption capacity: 80 mL/100 g
    pH: 8.0
    Specific surface area by BET method: 250 m$^2$/g
    Volatile content: 1.5 percent
Radiation-curable vinyl chloride copolymer of Example 1: 12 parts (as solid component)
Radiation-curable polyurethane resin of Reference Synthesis Example 2: 7.5 parts (as solid component)
Methyl ethyl ketone: 150 parts
Cyclohexanone: 150 parts The various components described above were kneaded in an open kneader and dispersed in a sand mill. To the dispersion obtained were added:
Butyl stearate: 1.5 parts
Stearic acid: 1 part
Methyl ethyl ketone: 50 parts
Cyclohexanone: 50 parts The mixture was stirred and filtered with a filter having an average pore diameter of 1 μm to prepare a coating liquid for a lower coating layer (nonmagnetic layer).

(3) Preparation of Backcoat Layer Coating Liquid

Carbon black (average particle diameter 40 nm): 85 parts
Carbon black (average particle diameter 100 nm): 3 parts
Nitrocellulose: 28 parts
Polyurethane resin of Reference Synthesis Example 3: 58 parts (as solid component)
Copper phthalocyanine dispersing agent: 2.5 parts
Nipporan 2301 (made by Nippon Polyurethane Industry Co., Ltd.): 0.5 part
Methyl isobutyl ketone: 0.3 part
Methyl ethyl ketone: 860 parts
Toluene: 240 parts The above components were preliminarily kneaded in a roll mill and then dispersed in a sand mill.
Polyester resin (Vylon 500 made by Toyobo Co., Ltd.): 4 parts
Polyisocyanate compound (Coronate 3041, made by Nippon Polyurethane Industry Co., Ltd.): 14 parts
α-$Al_2O_3$ (made by Sumitomo Chemical Co., Ltd.): 5 parts The above components were added and the mixture was stirred and filtered to prepare a backcoat layer coating liquid.

(4) Preparation of Magnetic Recording Medium

A coil bar was used to coat an adhesive layer in the form of a sulfonic acid-containing polyester resin in a quantity calculated to yield a dry thickness of 0.05 μm on a polyethylene naphthalate resin support 5 μm in thickness on the surface thereof having a centerline surface roughness of 0.003 μm on which a magnetic layer was to be coated.

Next, the above nonmagnetic layer coating liquid was coated in a quantity calculated to yield a dry thickness of 1.0 μm to form a coating layer. The coating layer was then irradiated with a 40 kG electron beam to form a nonmagnetic layer (radiation-cured layer).

Immediately thereafter, the magnetic layer coating liquid was coated over the nonmagnetic layer that had been formed in a multilayer coating in a quantity calculated to yield a magnetic layer thickness of 0.06 μm, oriented with a solenoid having a magnetic force of 0.4 T (4,000 G), and dried. On the reverse side of the nonmagnetic support, a backcoat layer coating liquid was then coated in a quantity calculated to yield a dry thickness of 0.5 μm. A seven-stage calender comprised of metal rolls was then used to conduct calendering at a rate of 80 m/minute at a temperature of 100° C. and the product was slit to a ½ inch width to prepare a magnetic recording tape.

Examples 13 to 15

With the exception that during the preparation of the nonmagnetic layer coating liquid in Example 12, the radiation-curable vinyl chloride copolymers indicated in Table 4 were employed instead of the radiation-curable vinyl chloride copolymer of Example 1, magnetic tapes were prepared by the same method as in Example 12.

Example 16

With the exception of items (1) and (2) below, a magnetic tape was prepared by the same method as in Example 12:

(1) During preparation of the magnetic layer coating liquid, the radiation-curable vinyl chloride copolymer of Example 1 was used instead of MR104 made by Zeon Corporation, and the radiation-curable polyurethane resin obtained in Reference Synthesis Example 2 was employed instead of the polyurethane resin obtained in Reference Synthesis Example 1.

(2) Before calendering, the coating layer of magnetic layer coating liquid was irradiated with a 40 kG electron beam to form the magnetic layer (a radiation-cured layer).

Example 17

With the exception of items (1) and (2) below, a magnetic tape was prepared by the same method as in Example 16:

(1) During preparation of the nonmagnetic layer coating liquid, MR104 made by Zeon Corporation was employed instead of the vinyl chloride copolymer of Example 1, the polyurethane resin obtained in Reference Synthesis Example 1 was employed instead of radiation-curable polyurethane resin, and five parts of polyisocyanate (Coronate 3041 made by Nippon Polyurethane Industry Co., Ltd.) were further added.

(2) Before coating the magnetic layer, the nonmagnetic layer was not irradiated with an electron beam, but was calendered at a rate of 80 m/minute at a temperature of 100° C. with a seven-stage calender comprised of metal rolls.

Comparative Example 2

With the exception that during preparation of the nonmagnetic layer coating liquid in Example 12, the radiation-curable vinyl chloride copolymer of Comparative Example 1 was employed instead of the radiation-curable vinyl chloride copolymer of Example 1, a magnetic tape was prepared by the same method as in Example 12.

<Methods of Evaluating the Magnetic Tapes>

The magnetic tapes prepared in Examples 12 to 17 and Comparative Example 2 were evaluated as set forth below. The results are given in Table 4.

(1) Surface Smoothness of Magnetic Layer

A 30×30 micrometer area was scanned with a Nanoscope II made by Digital Instruments at a tunnel current of 10 nA and a bias current of 400 mV to determine the number of protrusions of 10 to 20 nm in height. The relative value was given when the value of Comparative Example 2 was adopted as 100.

(2) Electromagnetic Characteristics (S/N Ratio)

The S/N ratio of each magnetic tape was measured with a fixed head, ½ inch linear system. The relative velocity of the head and tape was 10 m/s. Recording was conducted with a MIG head (track width: 18 μm) with a saturation magnetization of 1.4 T. The recording current was set to the optimum current for each tape. A reproduction head with an anisotropic MR head (A-MR) with an element thickness of 25 nm and a shield gap of 0.2 μm was employed.

A signal was recorded at a recording wavelength of 0.2 μm, and the reproduction signal was frequency-analyzed with a spectral analyzer made by ShibaSoku. The ratio of the output of the carrier signal (wavelength: 0.2 μm) to the noise integrated over the entire spectral region was adopted as the S/N ratio and expressed as a relative value when the value of Comparative Example 2 was adopted as 0 dB.

(3) Repeat Sliding Durability

The magnetic layer surface was contacted with a round rod made of AlTiC in a 40° C., 10 percent RH environment, a 100 g load was applied, and 10,000 repeat passes were made at a sliding rate of 2 m/s. The tape damage after sliding was observed visually and by an optical microscope (magnification: 100 to 500×). An evaluation was made according to the following scale:

Excellent: Almost no scratches visible, most portions scratch-free.

Good: Portions with scratches outnumbered scratch-free portions.

Defective: Complete separation of magnetic layer.

(4) Storage Property

A 600 m section of tape was wound onto the reel for an LTO-G3 cartridge and stored in that state for 2 weeks at 60° C. and 90 percent RH. The sliding durability of the tape following storage was measured by the same method as in (3) above.

TABLE 4

|  | Binder of magnetic layer | Binder of nonmagnetic layer |
| --- | --- | --- |
| Ex. 12 | Vinyl chloride copolymer + Polyurethane resin + Polyisocyanate compound (Thermosetting) | Radiation-curable vinyl chloride copolymer of Ex. 1 + Radiation-curable polyurethane resin (Radiation-curing) |
| Ex. 13 | Vinyl chloride copolymer + Thermosetting polyurethane resin + Polyisocyanate compound (Thermosetting) | Radiation-curable vinyl chloride copolymer of Ex. 2 + Radiation-curable polyurethane resin (Radiation-curing) |
| Ex. 14 | Vinyl chloride copolymer + Polyurethane resin + Polyisocyanate compound (Thermosetting) | Radiation-curable vinyl chloride copolymer of Ex. 3 + Radiation-curable polyurethane resin (Radiation-curing) |
| Ex. 15 | Vinyl chloride copolymer + Polyurethane resin + Polyisocyanate compound (Thermosetting) | Radiation-curable vinyl chloride copolymer of Ex. 4 + Radiation-curable polyurethane resin (Radiation-curing) |

TABLE 4-continued

| | | | | |
|---|---|---|---|---|
| Ex. 16 | Radiation-curable vinyl chloride copolymer of Ex. 1 + Radiation-curable polyurethane resin | | Radiation-curable vinyl chloride copolymer of Ex. 1 + Radiation-curable polyurethane resin (Radiation-curing) | |
| Ex. 17 | Radiation-curable vinyl chloride copolymer of Ex. 1 + Radiation-curable polyurethane resin | | Vinyl chloride copolymer + Polyurethane resin + Polyisocyanate compound (Thermosetting) | |
| Comp. Ex. 2 | Vinyl chloride copolymer + Polyurethane resin + Polyisocyanate compound (Thermosetting) | | Radiation-curable vinyl chloride copolymer of Comp. Ex. 1 + Radiation-curable polyurethane resin (Radiation-curing) | |

| | Surface smoothness | Electromagnetic characteristics | Repeat sliding durability | Storage property |
|---|---|---|---|---|
| Ex. 12 | 88 | 0.8 | Excellent | Excellent |
| Ex. 13 | 87 | 0.8 | Excellent | Excellent |
| Ex. 14 | 90 | 0.8 | Excellent | Excellent |
| Ex. 15 | 85 | 0.8 | Excellent | Excellent |
| Ex. 16 | 88 | 0.8 | Excellent | Excellent |
| Ex. 17 | 87 | 0.8 | Excellent | Excellent |
| Comp. Ex. 2 | 100 | 0 | Defective | Defective |

Evaluation Results

As indicated in Table 4, the magnetic tapes of Examples 12 to 17 exhibited better results in all evaluation categories than the magnetic tape of Comparative Example 2. The present inventors attributed these results to the following.

The reason the magnetic tapes of Examples 12 to 17 exhibited good surface smoothness was that applying the magnetic layer coating liquid after curing the nonmagnetic layer at a high curing rate inhibited interlayer mixing due to dissolution of the nonmagnetic layer into the magnetic layer coating liquid. In Examples 12 to 16, the radiation-curable vinyl chloride copolymers employed as the nonmagnetic layer coating liquids exhibited high curability rivaling that of the thermosetting resin employed as the nonmagnetic layer binder in Example 17. The fact that they formed strong coatings when irradiated with radiation then contributed to inhibiting the interlayer mixing. The reason why the magnetic tapes of Examples 12 to 17 exhibited good electromagnetic characteristics was presumed to be good magnetic layer surface properties (surface smoothness), as set forth above.

The reason why the magnetic tapes of Examples 12 to 17 exhibited good repeat sliding durability was that the good curability of the binder resin employed in the nonmagnetic layer inhibited the permeation of magnetic layer components into the nonmagnetic layer. There were few irregularities on the magnetic layer surface, and a uniform coating was formed. These results, as well, confirmed that the radiation-curable vinyl chloride copolymers used in the nonmagnetic layer in Examples 12 to 16 exhibited high curability rivaling that of the thermosetting resin employed in the nonmagnetic layer of Example 17. The fact that Examples 16 and 17, in which the radiation-curable vinyl chloride copolymer of Example 1 was employed as the magnetic layer binder, exhibited repeat running durability equivalent to that of Example 12 is a result indicating that the good curability of the radiation-curable vinyl chloride copolymer of Example 1 permitted the formation of a high-strength coating that rivaled that of the thermosetting resin employed as the magnetic layer binder in Example 12. The radiation-curable resin required a shorter curing period than the thermosetting resin. Accordingly, the fact that it was possible to form a high-strength coating rivaling that of a thermosetting resin with a radiation-curable resin is extremely advantageous in terms of productivity.

Further, when the nonmagnetic layer does not cure adequately, the quantity of nonmagnetic layer components migrating to the magnetic layer side increases, and the quantity of various components seeping out of the magnetic layer surface increases. When this happens, the tape sticks together during storage, precipitates form on the surface of the tape, and storage property thus deteriorates. The magnetic tapes of Examples 12 to 17 exhibited excellent storage property due to the good radiation curability of the nonmagnetic layer.

Based on the results set forth above, the present invention provided a radiation-curable vinyl chloride copolymer that exhibited excellent curability when irradiated with radiation. Employing the radiation-curable vinyl chloride copolymer as a binder made it possible to provide a magnetic recording medium simultaneously affording excellent running durability, storage property, and electromagnetic characteristics.

The magnetic recording medium of the present invention can exhibit good electromagnetic characteristics and excellent durability and storage property, and is thus suitable as a backup tape in which repeat running durability and storage property are required.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A radiation-curable vinyl chloride copolymer, which comprises a structural unit denoted by formula (1):

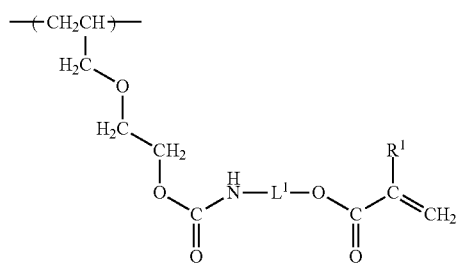

wherein, in formula (1), $R^1$ denotes a hydrogen atom or a methyl group, and $L^1$ denotes a divalent linking group denoted by formula (2), formula (3), or formula (4):

—CH$_2$CH$_2$—, (2)
—CH$_2$CH$_2$OCH$_2$CH$_2$—, (3)

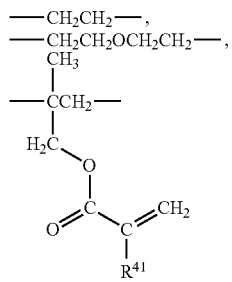 (4)

wherein, in formula (4), $R^{41}$ denotes a hydrogen atom or a methyl group.

2. The radiation-curable vinyl chloride copolymer according to claim 1, which further comprises a structural unit denoted by formula (5):

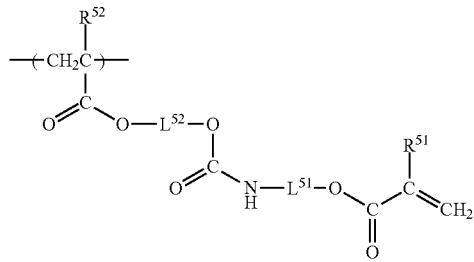

wherein, in formula (5), each of $R^{51}$ and $R^{52}$ independently denotes a hydrogen atom or a methyl group, $L^{51}$ denotes the divalent linking group denoted by formula (2), formula (3), or formula (4), and $L^{52}$ denotes a divalent linking group.

3. The radiation-curable vinyl chloride copolymer according to claim 1, which further comprises a cyclic ether structure.

4. The radiation-curable vinyl chloride copolymer according to claim 1, which comprises a polar group selected from the group consisting of a sulfonic acid group, a sulfonate group, a sulfuric acid group, and a sulfate group.

5. The radiation-curable vinyl chloride copolymer according to claim 4, which comprises a structural unit denoted by formula (6):

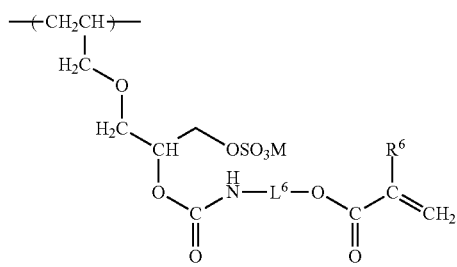

wherein, in formula (6), $R^6$ denotes a hydrogen atom or a methyl group, $L^6$ denotes the divalent linking group denoted by formula (2), formula (3), or formula (4), and M denotes a hydrogen atom or a cation.

6. A radiation-curable composition, which comprises the radiation-curable vinyl chloride copolymer according to claim 1.

7. The radiation-curable composition according to claim 6, which further comprises a benzoquinone compound.

8. The radiation-curable composition according to claim 6, which further comprises a radiation-curable polyurethane resin.

9. The radiation-curable composition according to claim 6, wherein the radiation-curable vinyl chloride copolymer further comprises a structural unit denoted by formula (5):

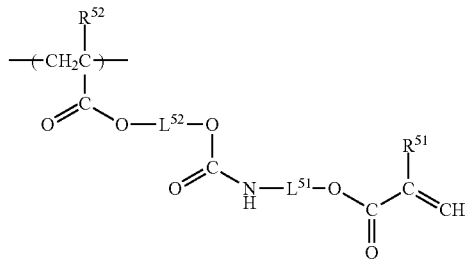

wherein, in formula (5), each of $R^{51}$ and $R^{52}$ independently denotes a hydrogen atom or a methyl group, $L^{51}$ denotes the divalent linking group denoted by formula (2), formula (3), or formula (4), and $L^{52}$ denotes a divalent linking group.

10. The radiation-curable composition according to claim 6, wherein the radiation-curable vinyl chloride copolymer further comprises a cyclic ether structure.

11. The radiation-curable composition according to claim 6, wherein the radiation-curable vinyl chloride copolymer further comprises a structural unit denoted by formula (6):

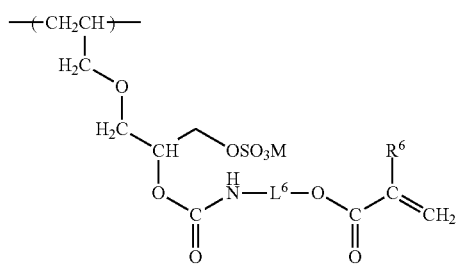

wherein, in formula (6), $R^6$ denotes a hydrogen atom or a methyl group, $L^6$ denotes the divalent linking group denoted by formula (2), formula (3), or formula (4), and M denotes a hydrogen atom or a cation.

12. A magnetic recording medium comprising a magnetic layer comprising a ferromagnetic powder and a binder on a nonmagnetic support, which comprises at least one radiation-cured layer obtained by radiation-curing a coating layer comprising a radiation-curable vinyl chloride copolymer, the radiation-curable vinyl chloride copolymer being the radiation-curable vinyl chloride copolymer according to claim 1.

13. The magnetic recording medium according to claim 12, wherein the radiation-cured layer is the magnetic layer.

14. The magnetic recording medium according to claim 12, which comprises a nonmagnetic layer comprising a nonmagnetic powder and a binder between the nonmagnetic support and the magnetic layer, the nonmagnetic layer being the radiation-cured layer.

15. The magnetic recording medium according to claim 12, wherein the coating layer further comprises a benzoquinone compound.

16. The magnetic recording medium according to claim 12, wherein the coating layer further comprises a radiation-curable polyurethane resin.

17. The magnetic recording medium according to claim 12, wherein the radiation-curable vinyl chloride copolymer further comprises a structural unit denoted by formula (5):

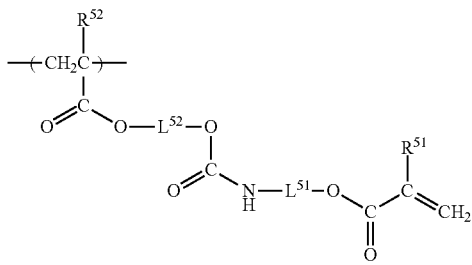

(5)

wherein, in formula (5), each of $R^{51}$ and $R^{52}$ independently denotes a hydrogen atom or a methyl group, $L^{51}$ denotes the divalent linking group denoted by formula (2), formula (3), or formula (4), and $L^{52}$ denotes a divalent linking group.

18. The magnetic recording medium according to claim 12, wherein the radiation-curable vinyl chloride copolymer further comprises a cyclic ether structure.

19. The magnetic recording medium according to claim 12, wherein the radiation-curable vinyl chloride copolymer comprises a polar group selected from the group consisting of a sulfonic acid group, a sulfonate group, a sulfuric acid group, and a sulfate group.

20. The magnetic recording medium according to claim 19, wherein the radiation-curable vinyl chloride copolymer comprises a structural unit denoted by formula (6):

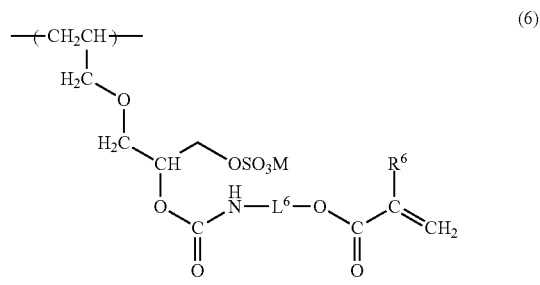

(6)

wherein, in formula (6), $R^6$ denotes a hydrogen atom or a methyl group, $L^6$ denotes the divalent linking group denoted by formula (2), formula (3), or formula (4), and M denotes a hydrogen atom or a cation.

* * * * *